(12) United States Patent
McBride

(10) Patent No.: US 11,604,780 B2
(45) Date of Patent: Mar. 14, 2023

(54) METHOD AND SUBSYSTEM THAT EFFICIENTLY STORE METRIC DATA

(71) Applicant: VMware, Inc., Palo Alto, CA (US)

(72) Inventor: Sam McBride, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1664 days.

(21) Appl. No.: 15/190,936

(22) Filed: Jun. 23, 2016

(65) Prior Publication Data
US 2017/0371872 A1    Dec. 28, 2017

(51) Int. Cl.
*G06F 16/00* (2019.01)
*G06F 16/22* (2019.01)
*G06F 16/23* (2019.01)
*G06F 3/06* (2006.01)

(52) U.S. Cl.
CPC .......... *G06F 16/2255* (2019.01); *G06F 3/061* (2013.01); *G06F 3/065* (2013.01); *G06F 3/067* (2013.01); *G06F 16/2379* (2019.01)

(58) Field of Classification Search
CPC combination set(s) only.
See application file for complete search history.

(56) References Cited

U.S. PATENT DOCUMENTS

| | | | | |
|---|---|---|---|---|
| 5,813,002 A * | 9/1998 | Agrawal | ................. | G06F 16/00 707/999.005 |
| 7,271,747 B2 * | 9/2007 | Baraniuk | ............... | H04N 19/60 341/87 |
| 8,234,640 B1 * | 7/2012 | Fitzgerald | ............... | G06F 21/56 718/1 |
| 8,234,641 B2 * | 7/2012 | Fitzgerald | ............... | G06F 21/51 718/1 |
| 8,417,938 B1 * | 4/2013 | Considine | ............... | H04L 41/12 713/151 |
| 8,458,695 B2 * | 6/2013 | Fitzgerald | ........... | G06F 9/45558 718/1 |
| 8,612,971 B1 * | 12/2013 | Fitzgerald | ........... | G06F 9/45558 718/1 |
| 8,839,246 B2 * | 9/2014 | Fitzgerald | ............... | G06F 9/455 718/1 |

(Continued)

OTHER PUBLICATIONS

Arefin, A. and Jiang, G., Oct. 2011. Cloudinsight: Shedding light on the cloud. In Reliable Distributed Systems (SRDS), 2011 30th IEEE Symposium on (pp. 219-228). IEEE.*

*Primary Examiner* — Farhan M Syed

(57) ABSTRACT

The current document is directed to methods and subsystems within computing systems, including distributed computing systems that efficiently store metric data by approximating a sequence of time-associated data values with one or more linear functions. In a described implementation, a running variability metric is used to control variation within the metric data with respect to the approximating linear functions, with a variation threshold employed to maximize the number of data points represented by a given linear function while ensuring that the variation of the data with respect to the given linear function does not exceed a threshold value. In one implementation, the metric data occurs within a graph-like configuration-management-database representation of the current state of a computer system.

9 Claims, 38 Drawing Sheets

(56) References Cited

U.S. PATENT DOCUMENTS

| | | | | |
|---|---|---|---|---|
| 8,850,433 B2* | 9/2014 | Fitzgerald | ............ | H04L 63/0263 |
| | | | | 718/1 |
| 8,949,825 B1* | 2/2015 | Fitzgerald | ............ | G06F 9/45537 |
| | | | | 718/1 |
| 9,635,132 B1* | 4/2017 | Lin | ..................... | H04L 67/1097 |
| 9,817,866 B1* | 11/2017 | Barrett | ................ | H03M 7/3095 |
| 10,129,337 B2* | 11/2018 | Lin | ......................... | H04L 63/08 |
| 2007/0027656 A1* | 2/2007 | Baraniuk | ............. | G06K 9/6232 |
| | | | | 702/189 |
| 2008/0129560 A1* | 6/2008 | Baraniuk | ............. | G06K 9/6232 |
| | | | | 341/87 |
| 2011/0261049 A1* | 10/2011 | Cardno | ................. | G06Q 40/04 |
| | | | | 345/419 |
| 2012/0266170 A1* | 10/2012 | Zimmerman | ........ | G06F 9/45558 |
| | | | | 718/1 |
| 2013/0247045 A1* | 9/2013 | Fitzgerald | ............... | G06F 9/455 |
| | | | | 718/1 |
| 2015/0333824 A1* | 11/2015 | Swinkels | ............ | H04J 14/0241 |
| | | | | 398/25 |
| 2017/0230459 A1* | 8/2017 | Lin | ......................... | H04L 69/04 |
| 2019/0082012 A1* | 3/2019 | Lin | ....................... | G06F 3/0605 |

* cited by examiner

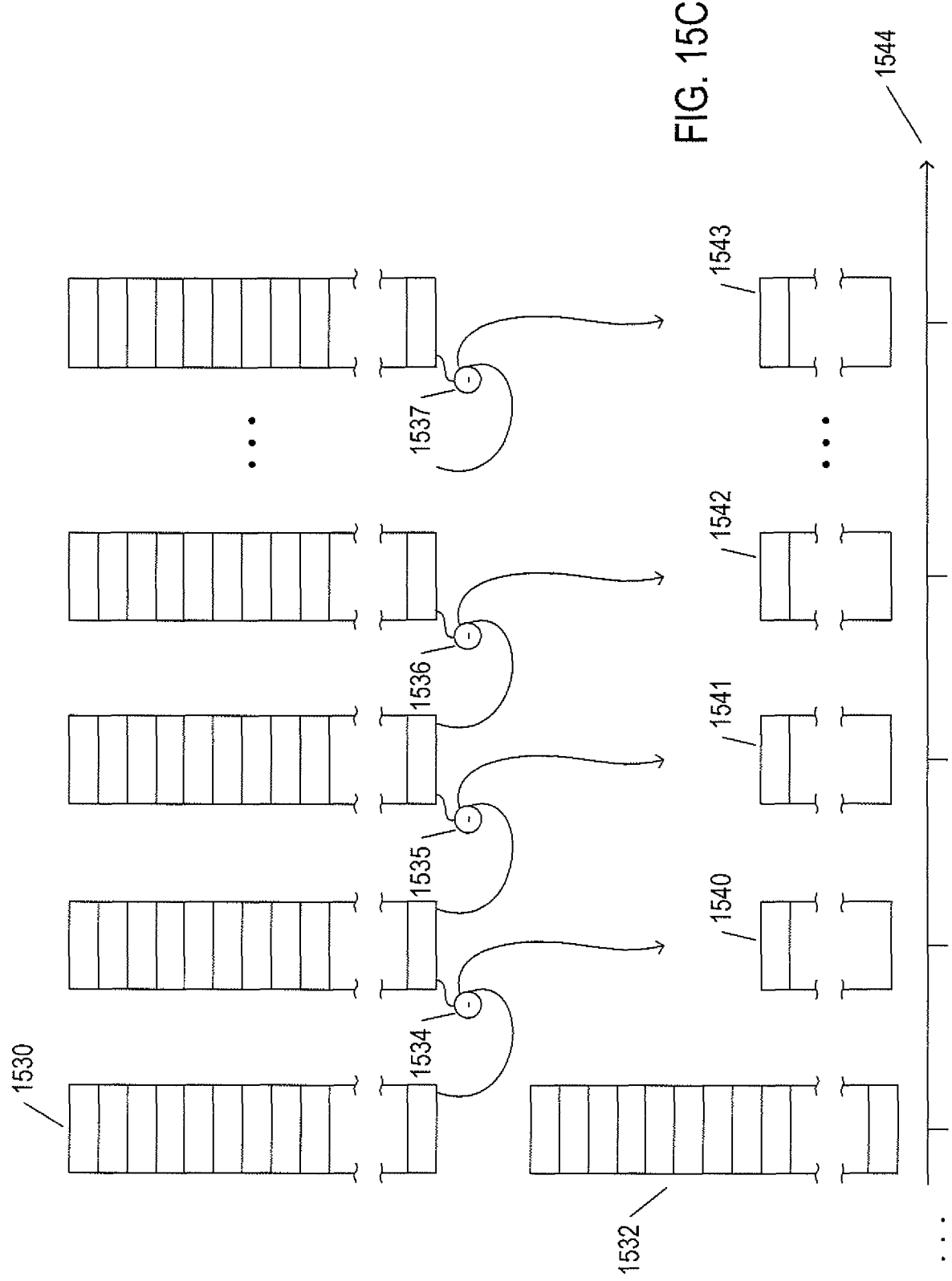

$y = mx + b$ $3 = m(0) + b$ $3 = m(3) + b$ $3 = m(6) + b$ $3 = m(9) + b$ $3 = m(12) + b$ $6 = m(15) + b$ $7 = m(18) + b$ $4 = m(21) + b$ $2 = m(24) + b$ $4 = m(25) + b$ $E(m,b) = \sum_{i=1}^{n}(y_i - mt_i + b)^2$ — 1632

$E(m,b) = [3-b]^2 + [3-(3m+b)]^2 + [3-(6m+b)]^2 + [3-(9m+b)]^2 + [3-(12m+b)]^2 +$
$[6-(15m+b)]^2 + [7-(18m+b)]^2 + [4-(21m+b)]^2 + [2-(24m+b)]^2 + [4-(25m+b)]^2$ $= 166 - 1076m - 76b + 2461_m^2 + 266mb + 10b^2$ — 1634

$\dfrac{\partial E_{m,b}}{\partial m} = -1076 + 4922m + 266b = 0$ — 1636

$\dfrac{\partial E_{m,b}}{\partial b} = -76 + 266m + 20b = 0$ — 1638

$-65.2 + 1384.2m = 0$ $m = .0047$ — 1640

$b = 3.17$

— 1630

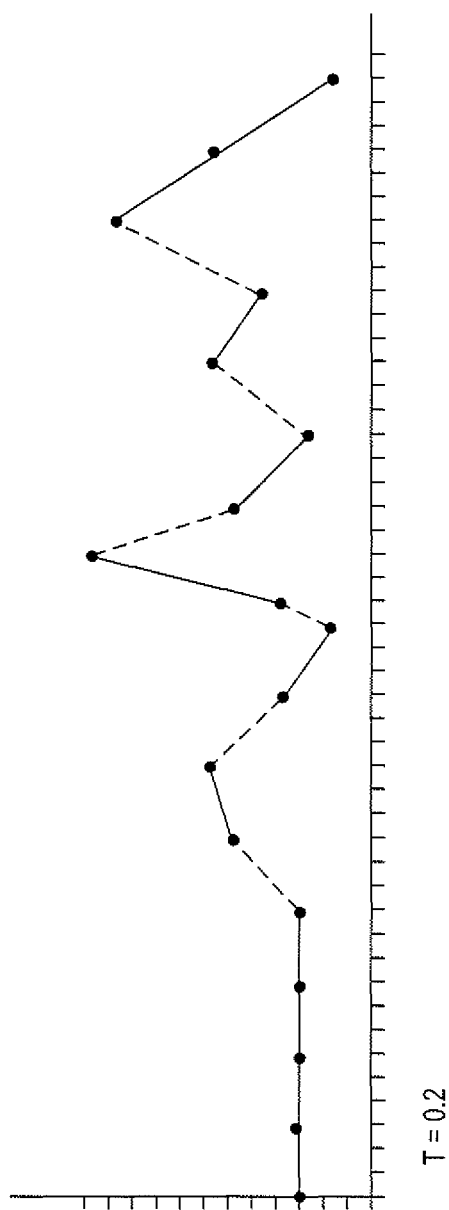

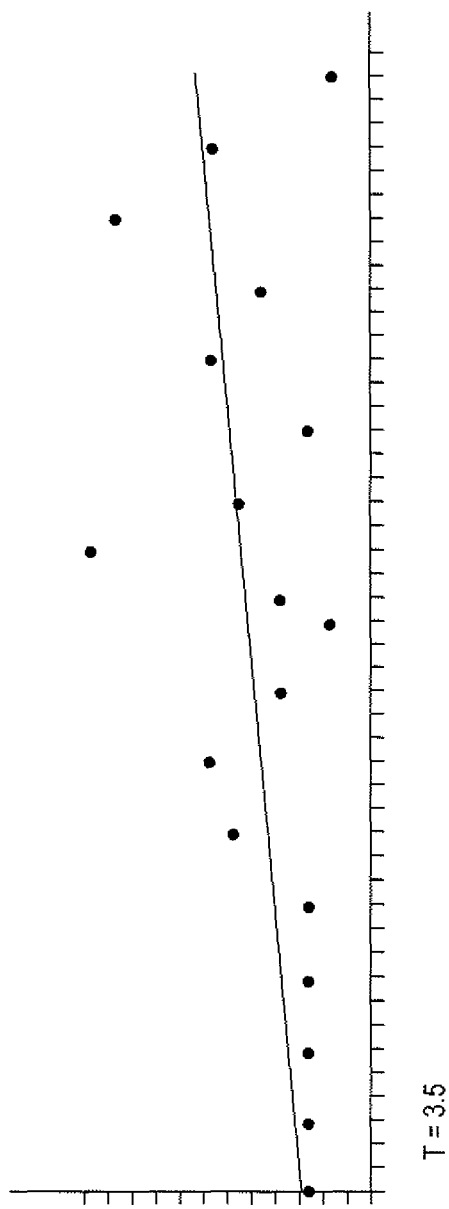

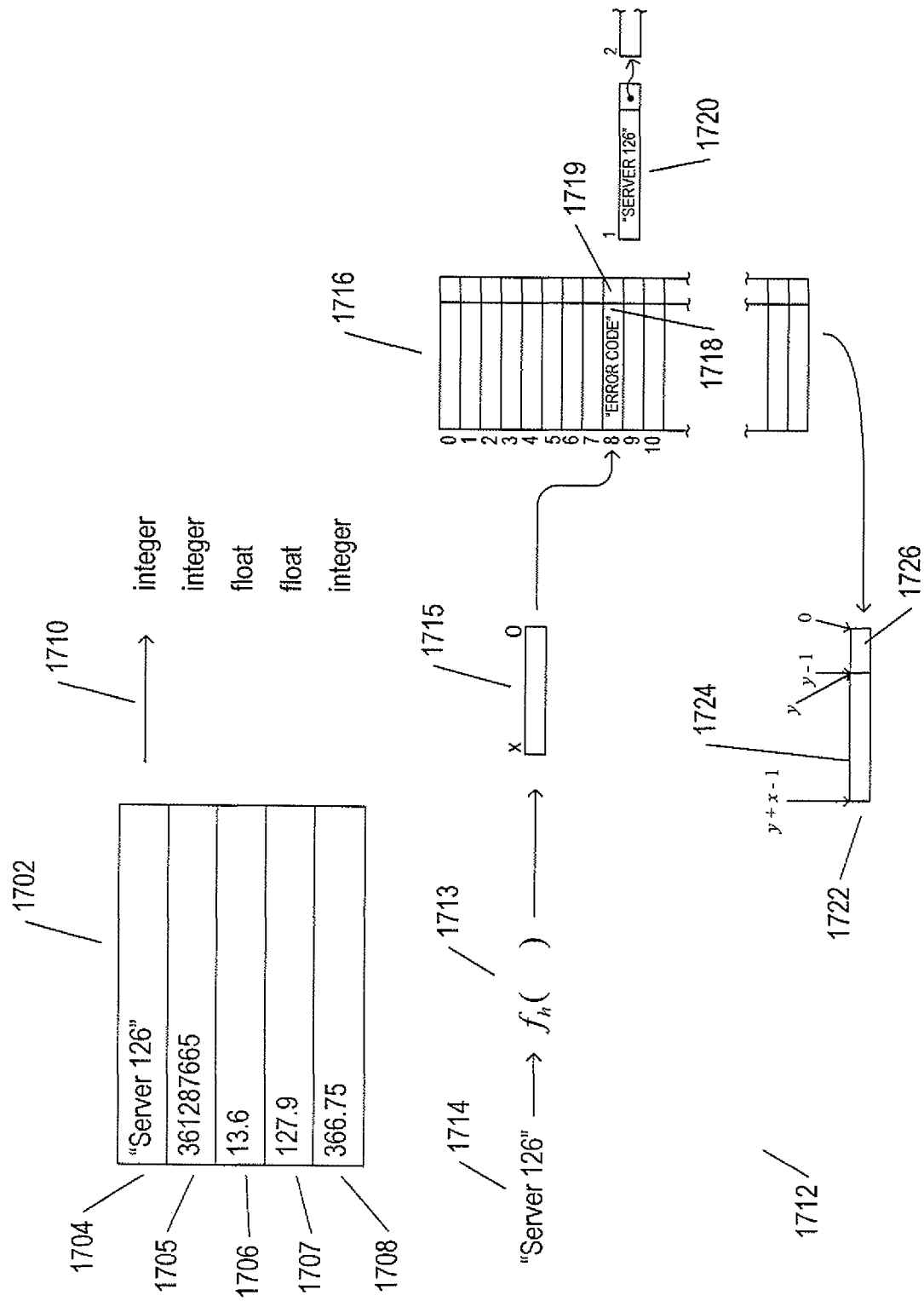

METHOD AND SUBSYSTEM THAT EFFICIENTLY STORE METRIC DATA

TECHNICAL FIELD

The current document is directed to data storage and data compression and, in particular, to methods and subsystems that compress property and metric data within computer systems by approximating metric data as a sequence of linear functions.

BACKGROUND

Computer systems have evolved enormously in the past 60 years. Initial computer systems were room-sized, vacuum-tube-based behemoths with far less computational bandwidth and smaller data-storage capacities than a modern smart phone or even a microprocessor controller embedded in any of various consumer appliances and devices. Initial computer systems ran primitive programs one at a time, without the benefit of operating systems, high-level languages, and networking. Over time, parallel development of hardware, compilers, operating systems, virtualization technologies, and distributed-computing technologies has led to modern distributed computing systems, including cloud-computing facilities, that feature hundreds, thousands, tens of thousands, or more high-end servers, each including multiple multi-core processors, that can access remote computer systems and that can be accessed by remote client computers throughout the world through sophisticated electronic communications. As the complexity of computer systems has grown, the administration and management of computer systems has exponentially grown in complexity, in the volume of data generated and stored for administration and management purposes, and in the computational-bandwidth used for collecting and processing data that reflects the internal operational state of the computer systems and their subsystems and components. While the operational state of an early computer system may well have been encapsulated in a handful of status registers and a modest amount of information printed from teletype consoles, gigabytes or terabytes of metric data may be generated and stored by internal automated monitoring, administration, and management subsystems within a modern distributed computing system on a daily or weekly basis. Storage and processing of these large volumes of data generated by automated monitoring, administration, and maintenance subsystems within distributed computing systems is rapidly becoming a computational bottleneck with respect to further evolution, expansion, and improvement of distributed computing systems. For this reason, designers, developers, vendors, and, ultimately, users of computer systems continue to seek methods and subsystems to more efficiently store, process, and interpret the voluminous amount of metric data internally generated within distributed computing systems to facilitate automated administration and management of distributed computing systems, including diagnosing performance and operational problems, anticipating such problems, and automatically reconfiguring and repairing distributed-system-components to address identified and anticipated problems.

SUMMARY

The current document is directed to methods and subsystems within computing systems, including distributed computing systems, that efficiently store metric data by approximating a sequence of time-associated data values with one or more linear functions. In a described implementation, a running variability metric is used to control variation within the metric data with respect to the approximating linear functions, with a variation threshold employed to maximize the number of data points represented by a given linear function while ensuring that the variation of the data with respect to the given linear function does not exceed a threshold value. Non-numeric metric data is converted into numeric metric data in order to facilitate approximation of the metric data by linear functions. In one implementation, the metric data occurs within a graph-like configuration-management-database representation of the current state of a computer system and the metric-data-approximating methods are used to facilitate compression of the configuration-management database at time intervals during operation of a computer system.

BRIEF DESCRIPTION OF THE DRAWINGS

FIGS. 15A-C illustrate currently used techniques for storing the contents of a CMDB within a computer system.

FIGS. 16A-L illustrate a more efficient method for storing metric and property data representations that can be used to significantly decrease the physical-data-storage overheads associated with storing the contents of a CMDB.

FIGS. 17A-C illustrate the use of ongoing linear approximation of metric data for both properties and metrics associated with CMDB objects in order to compactly store property and metric data within the CMDB.

DETAILED DESCRIPTION OF EMBODIMENTS

The current document is directed to a method and subsystem for efficiently storing metric data within a computer system. In a first subsection, below, an overview of distributed computing systems is provided, with reference to FIGS. 1-10. In a second subsection, implementations of the methods and subsystems to which the current document is directed are discussed, with reference to FIGS. 11-18D.

Overview of Distributed Computing Systems

Figure 1:
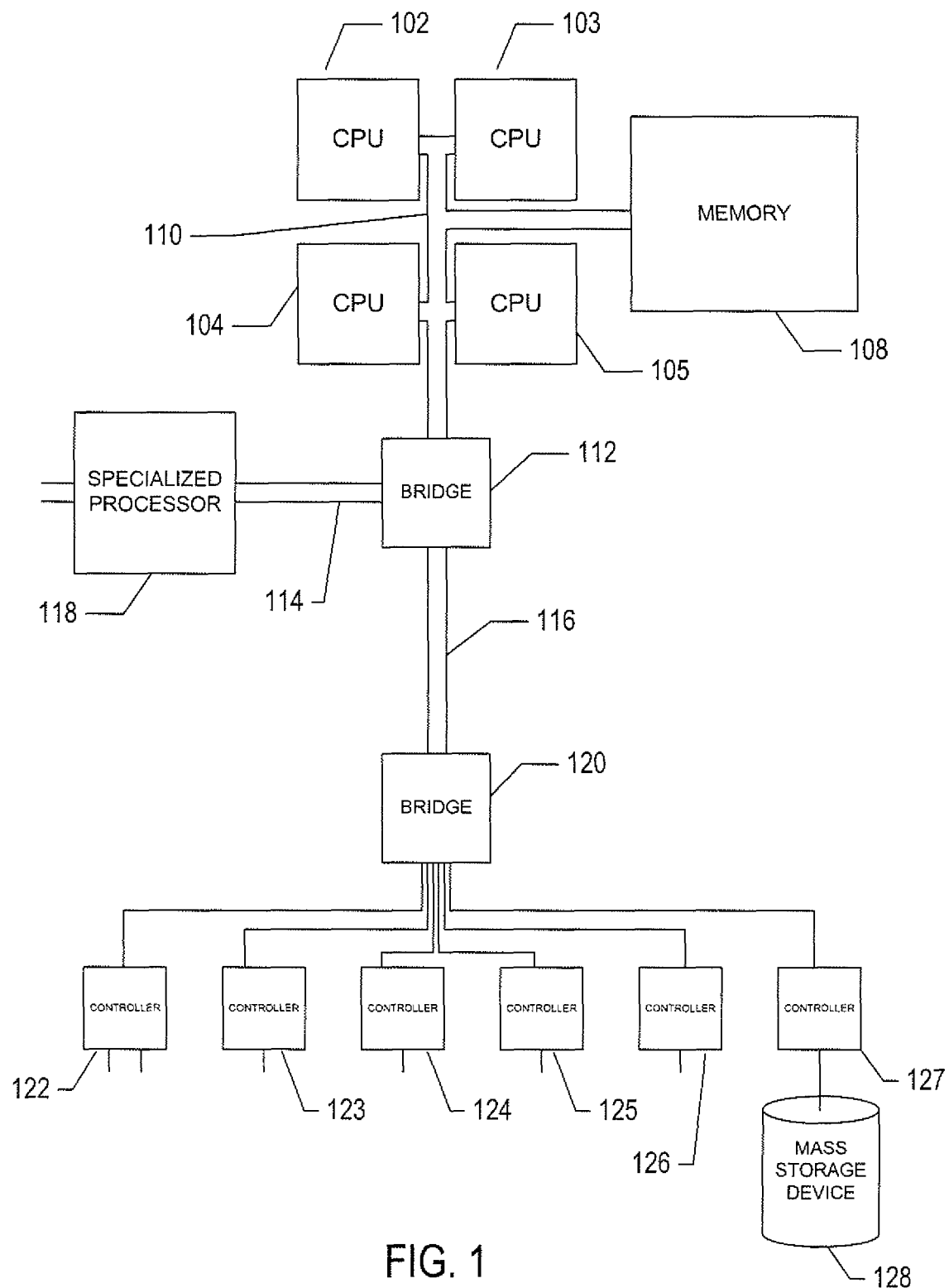
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
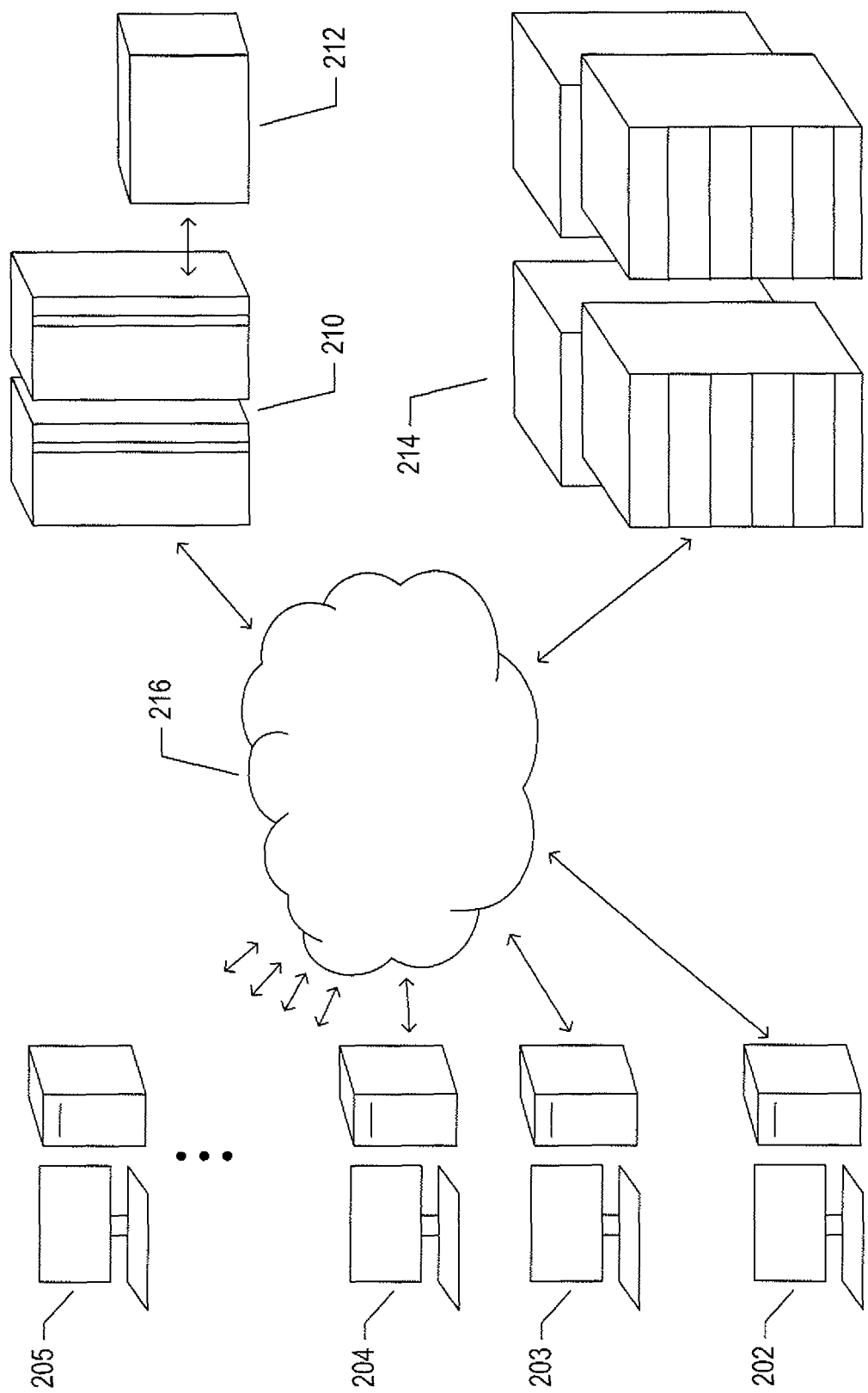
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
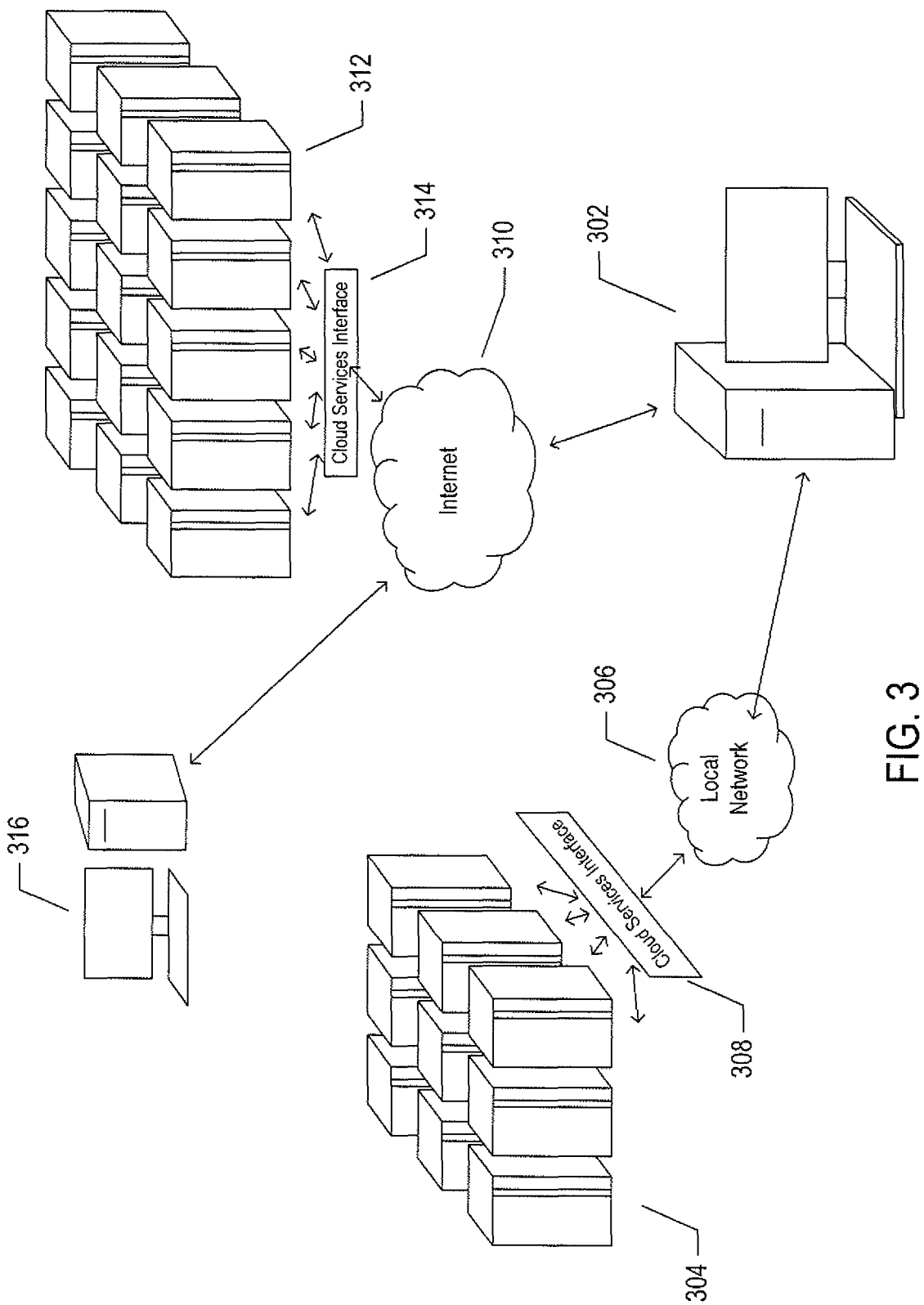
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades.

Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
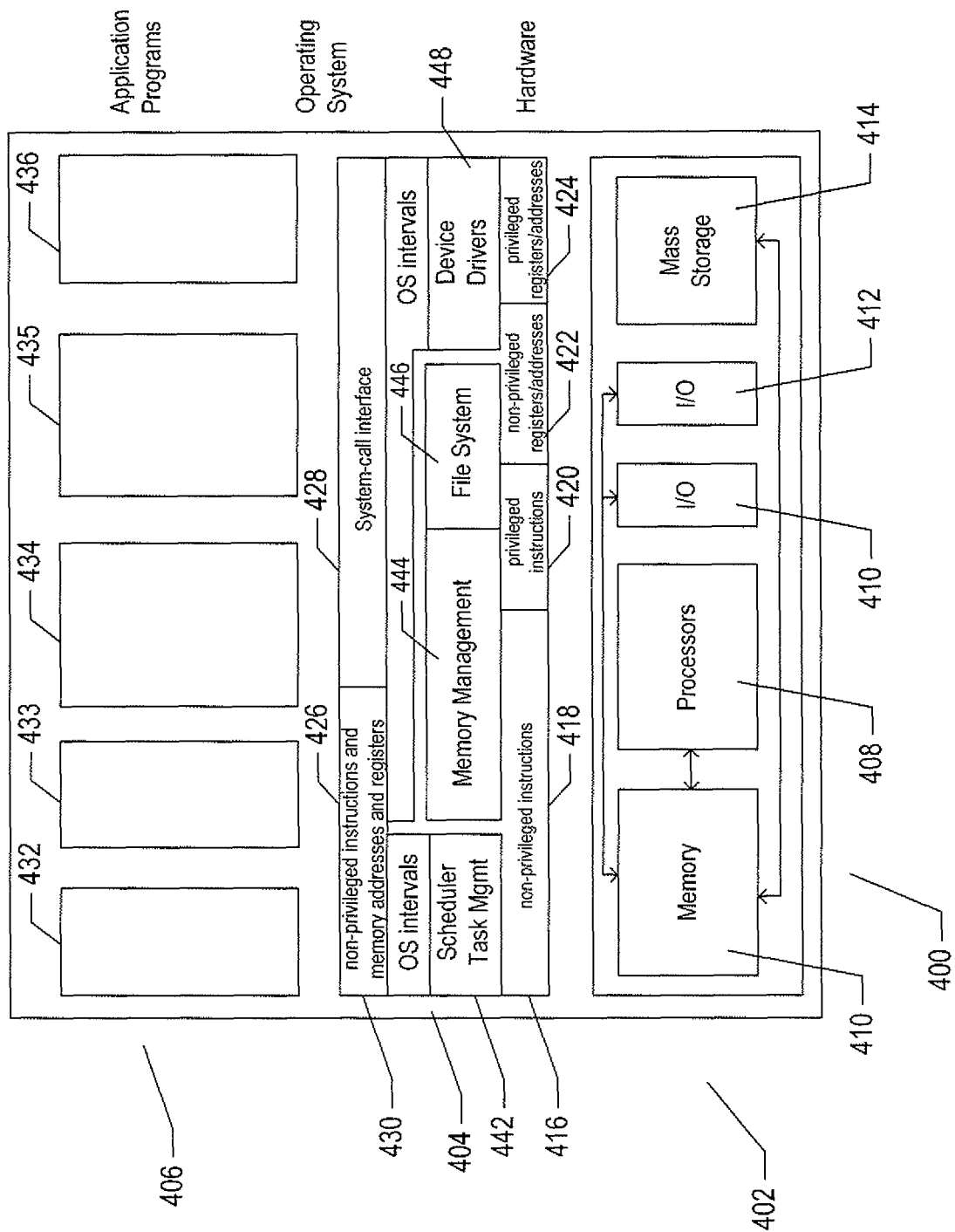
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
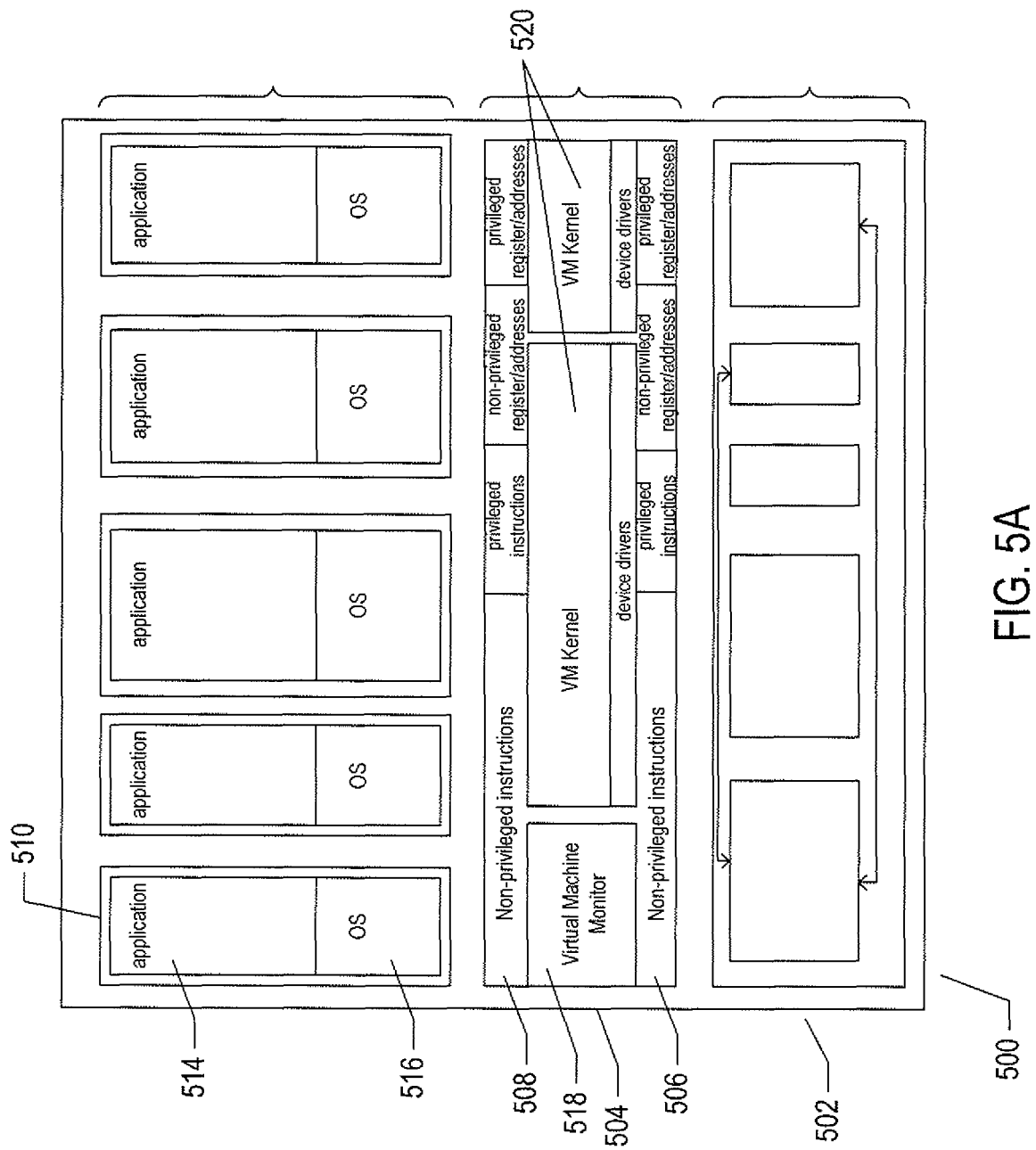
FIGS. 5A-B illustrate two types of virtual machine and virtual-machine execution environments.
Figure 5B:
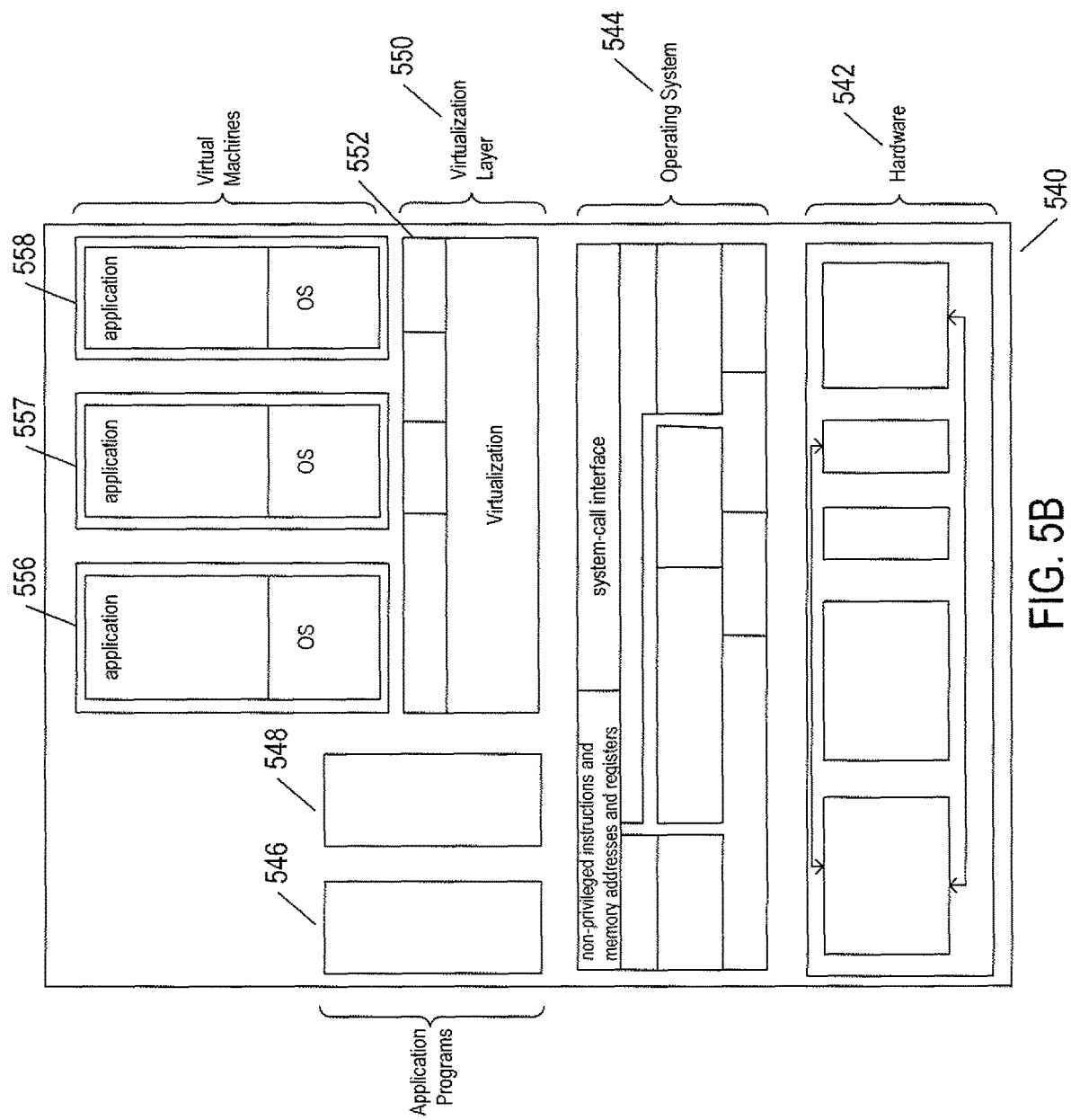

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
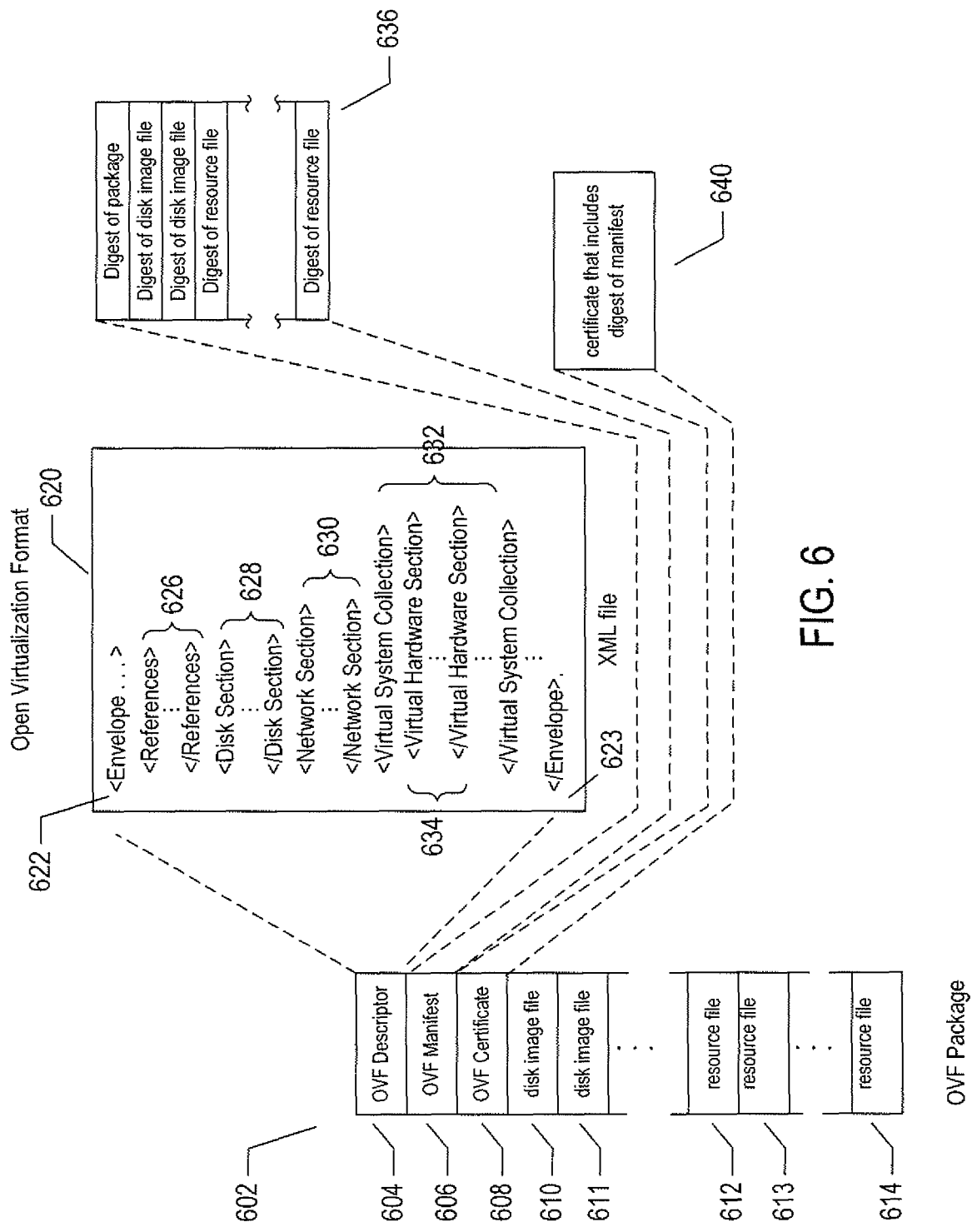
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
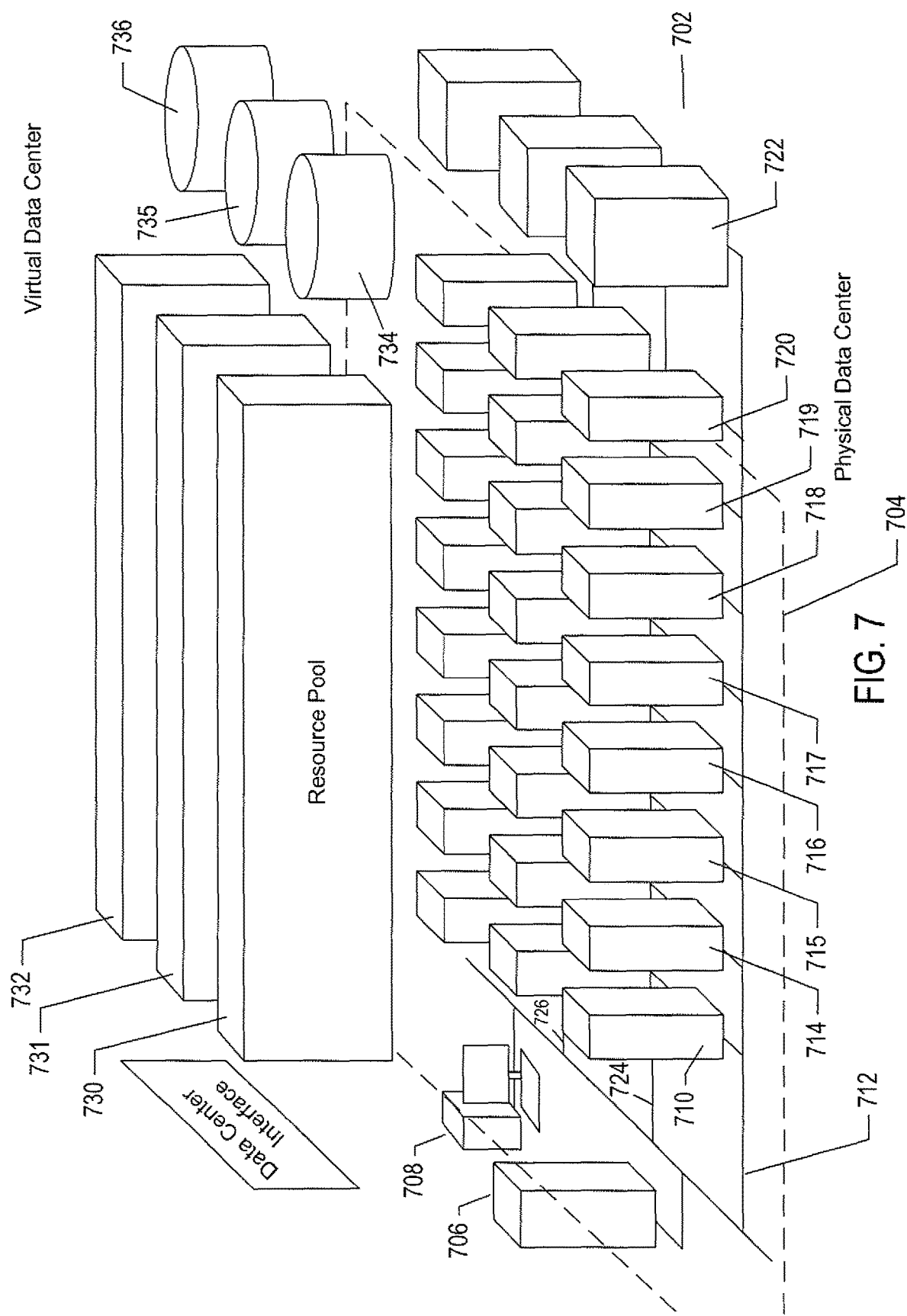
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
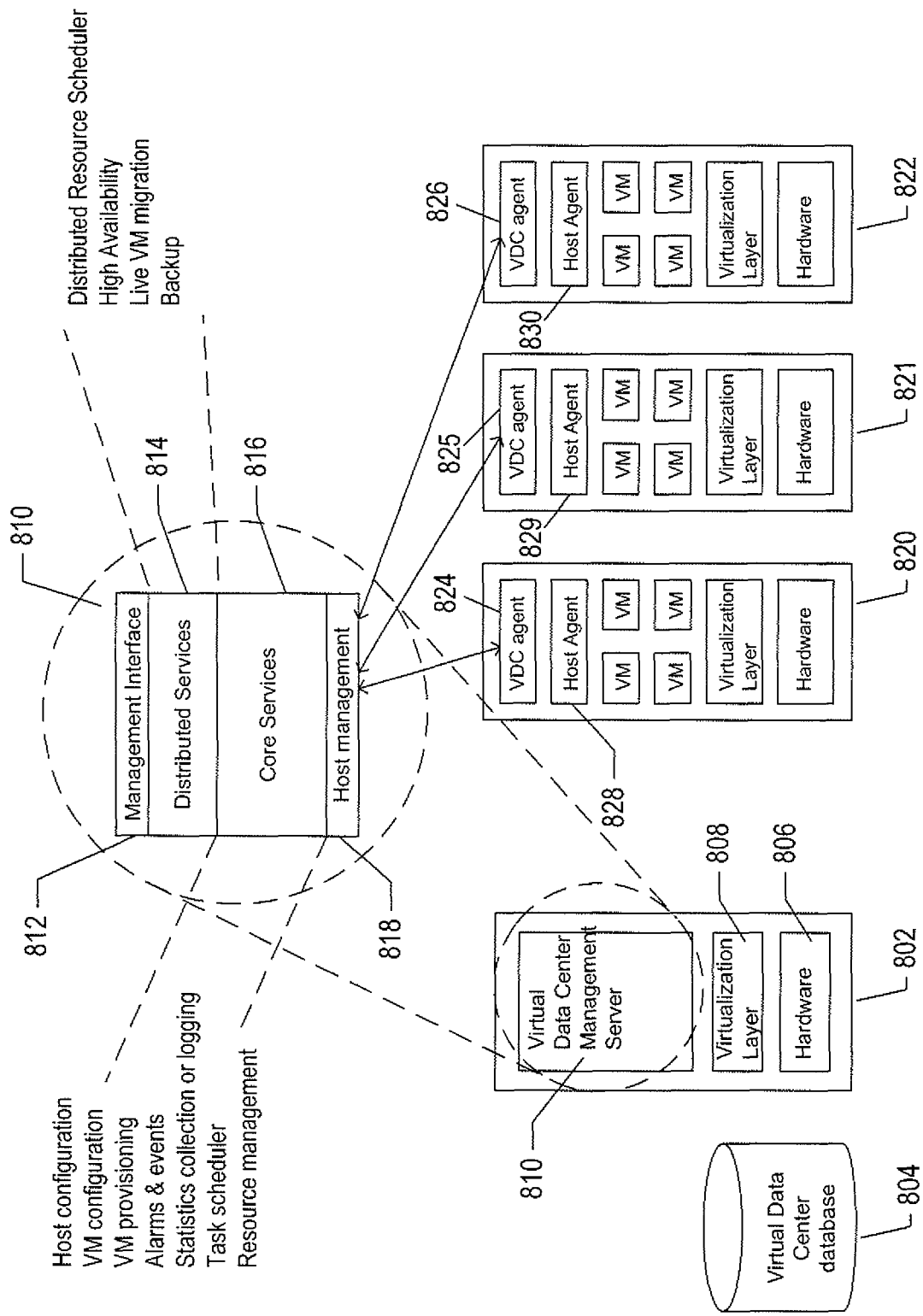
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
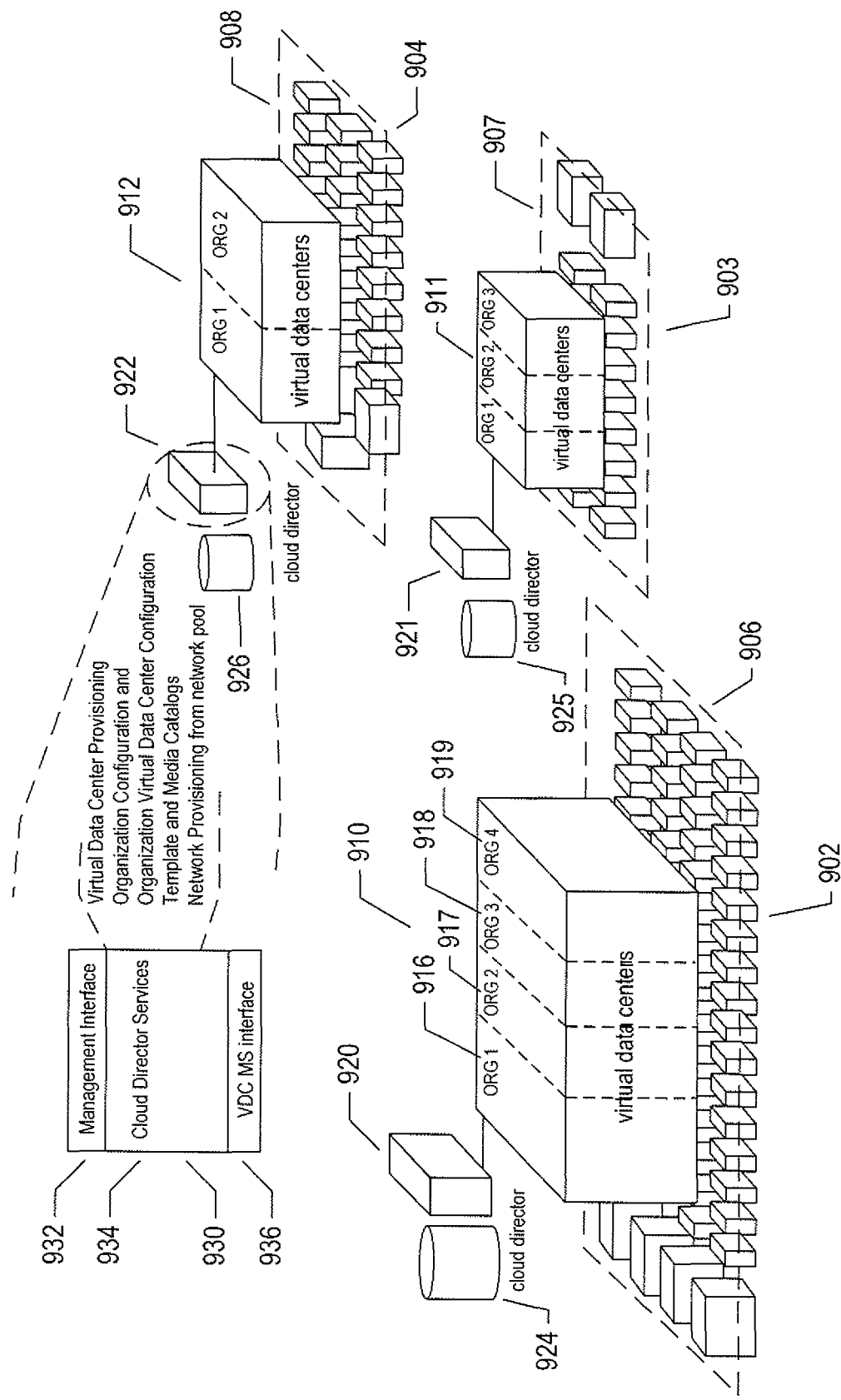
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
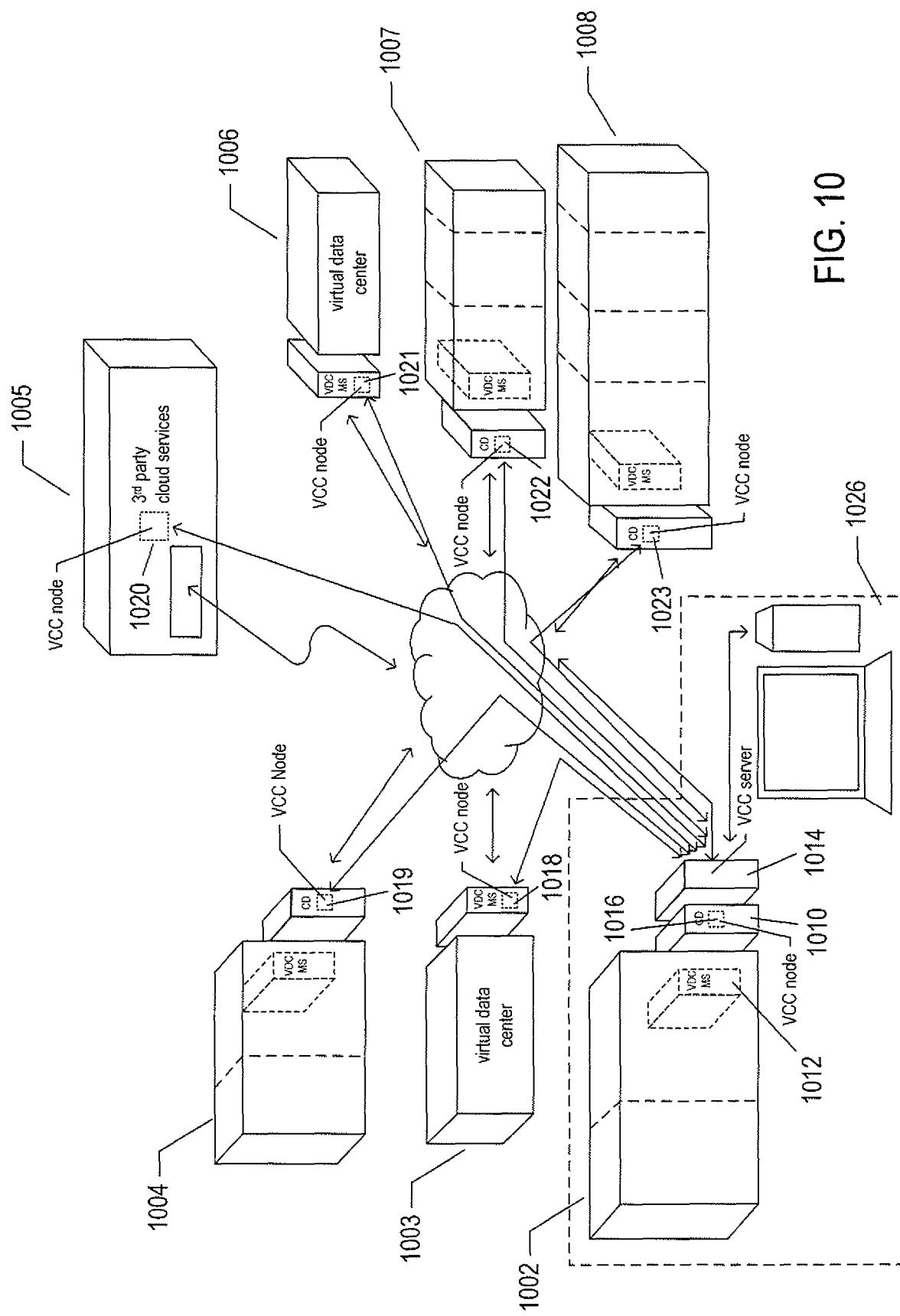
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Method and Subsystems for Efficiently Storing Metric Data

Figure 11:
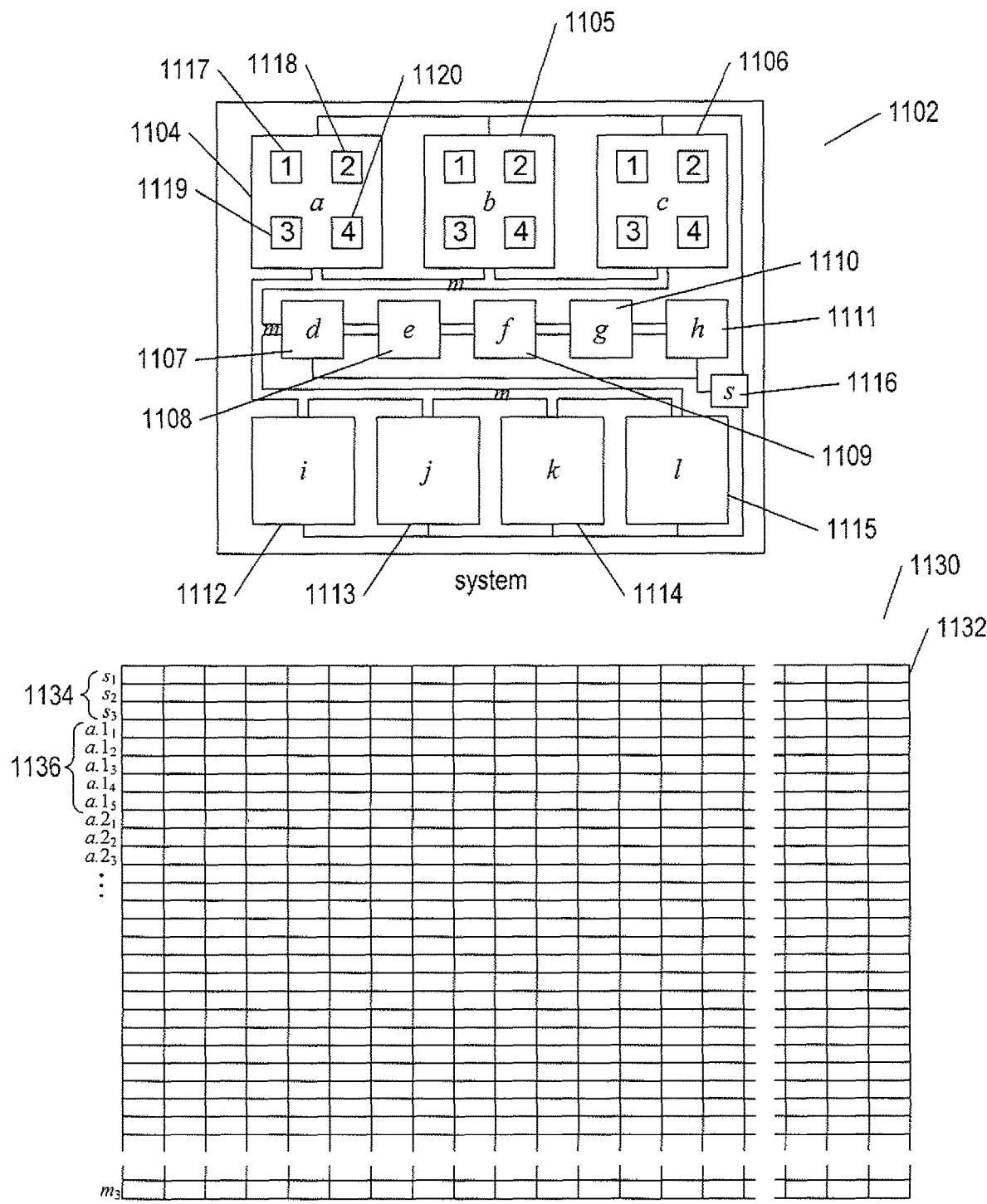
FIG. 11 illustrate metric data that is collected, processed, and used by the administrative and management subsystems within a computer system.

FIG. 11 illustrate metric data that is collected, processed, and used by the administrative and management subsystems within a computer system. At the top of FIG. 11, an abstract system block diagram 1102 is shown. This system includes 11 main subcomponents a-m and s 1104-1116 and four subcomponents in each of components a, b, and c, such as subcomponents 1117-1120 in component a 1104. The system is abstractly characterized and no further details with regard to component functionalities, interfaces, and connections are provided.

In a complex system, various types of information are collected with regard to the operational states and statuses of many, if not all, components, subcomponents, systems, and subsystems. The information can be encoded in many different ways, can be expressed in many different forms, and can be provided by a number of different information sources. For example, metrics may be provided by various types of monitoring applications and monitoring hardware within a computer system. As another example, metrics may be obtained from log files that store various types of log messages and error messages generated by computer-system components. However, for the purposes of the current discussion, this information can be described as a set of time-stamped or time-associated floating-point numbers. Clearly, even for descriptive textural information, there is generally a finite number of different values or forms of the information, as a result of which any such information can be mapped to numeric values. Thus, no generality is lost by considering the information from various types of monitoring and diagnostic agents and subsystems within the system to be floating-point values, also referred to as "metric values" and "metric data." Information may be generated, within the system, with regard to each of the systems, subsystems, components, and subcomponents within a computational system. Thus, the operational state and status of each component, subcomponent, system, and subsystem is described, at any given point in time, by the current values for all attributes reported for the component, subcomponent, system, or subsystem. Table 1130, in the lower portion of FIG. 11, illustrates a portion of the metric data collected for the system shown in block diagram 1102. Each row in the table, such as the first row 1132, represents a time series of metric-data values. The first three rows 1134 of the table represent the data of three different metrics, $s_1$, $S_2$, and $s_3$ for subcomponent s 1116. The next five rows 1136 of table 1130 represent the data stored for five metrics associated with subcomponent 1 (1117 in FIG. 11) of subcomponent a 1104. Additional rows of the table represent data for additional metrics collected for the other components of the abstract computer system represented by block diagram 1102. In an actual computer system, there may be tens or hundreds of different metrics associated with any particular main subcomponent of a distributed computing system, and there may be thousands, tens of thousands, or more subcomponents.

Figure 12:
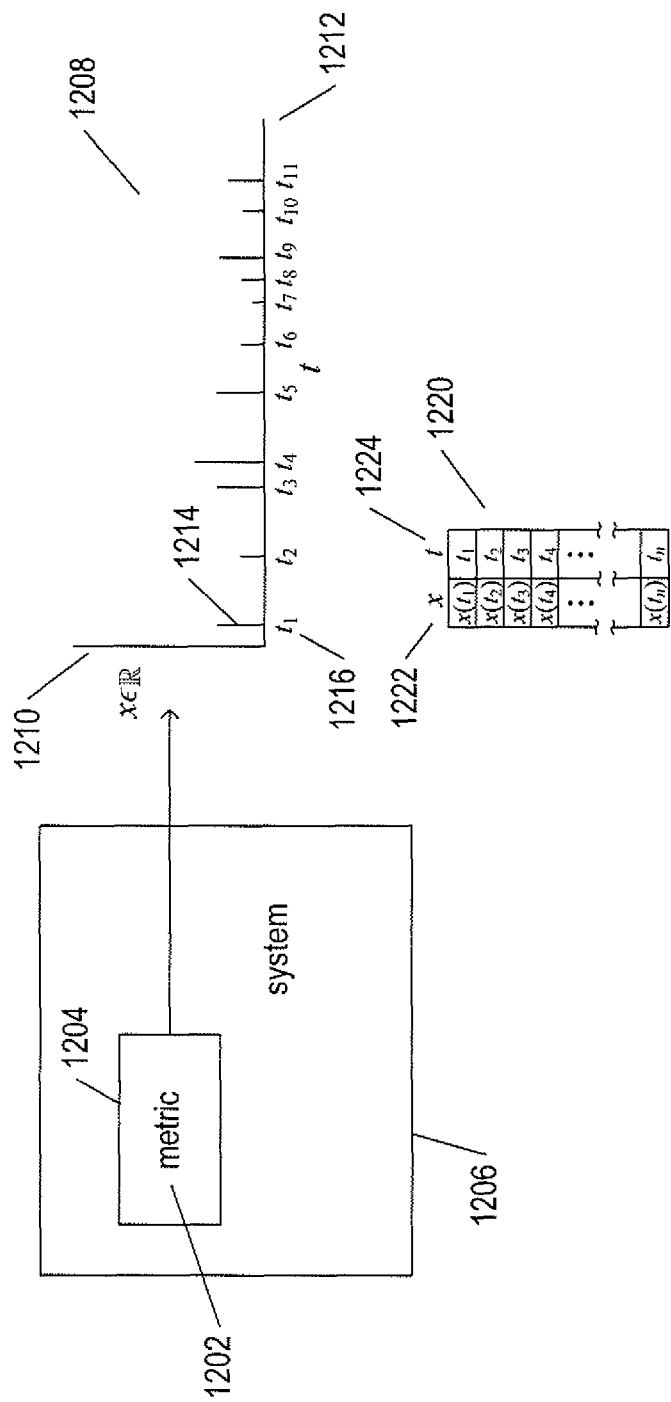
FIG. 12 illustrates metric data.
Figure 13:
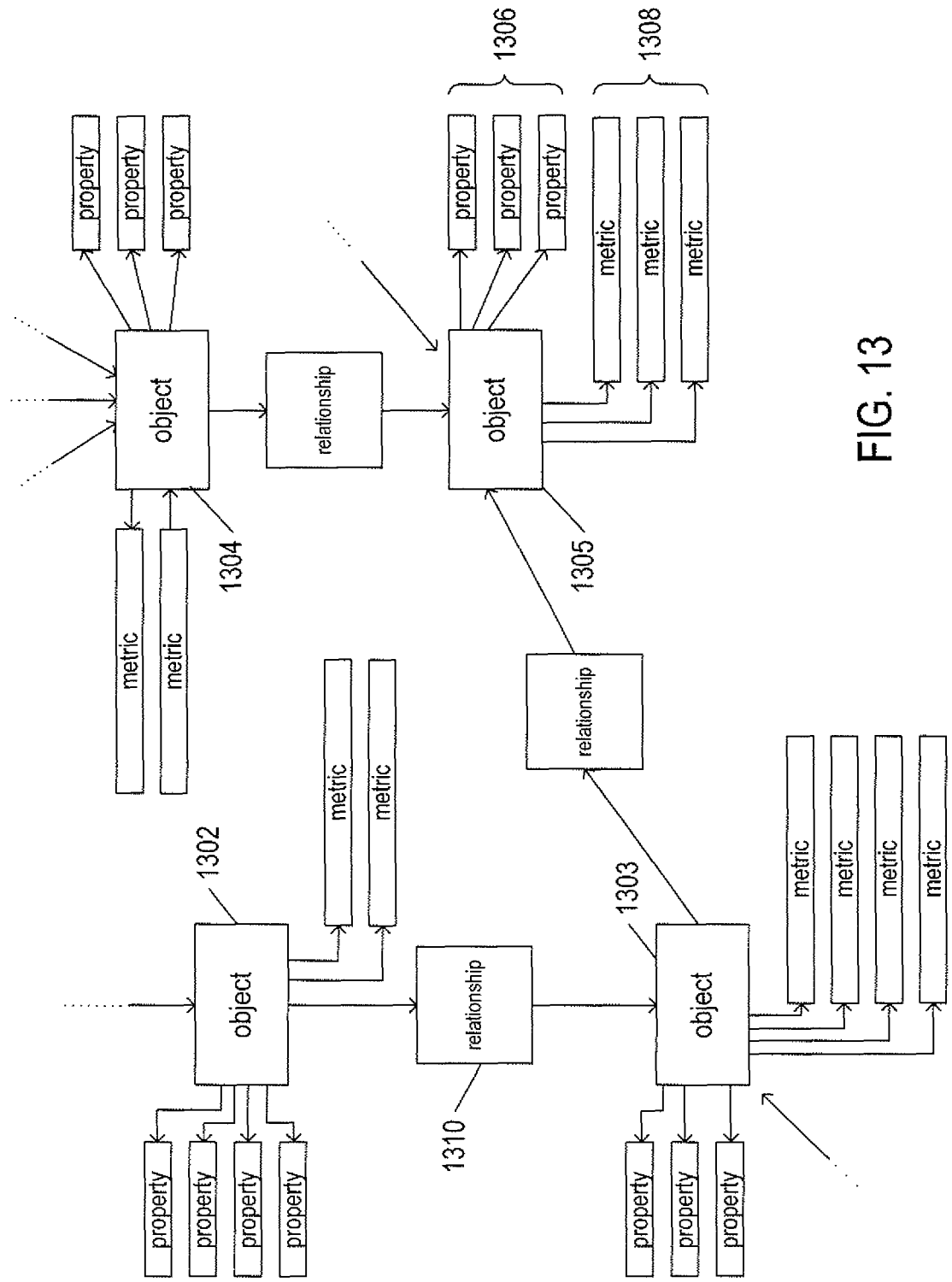
FIG. 13 illustrates a configuration-management database ("CMDB").

FIG. 12 illustrates metric data. In FIG. 12, a metric 1202 is shown to be associated with a component 1204 of a system 1206. The metric generates a time-associated sequence of numeric values, a portion of which is shown in plot 1208. The vertical axis represents floating-point values 1210 and the horizontal axis represents time 1212. Each data point is shown in the plot as a vertical bar, such as vertical bar 1214 associated with time $t_1$ 1216, the length of the vertical bar representing a floating-point value. In many cases, a metric outputs data values associated with timestamps over an extended period of time. Often, the data values associated with particular time intervals are compressed and stored in long-term storage. For example, the raw data values may be temporarily stored without compression, and blocks, chunks, or other such portions of these data values may be periodically compressed and stored in long-term storage while newly generated data values continue to accumulate in raw form. The data values for a metric may be alternatively represented by a table 1220 that includes a first column 1222 that stores numeric values and a second column 1224 that stores the associated times or timestamps. As shown in expression 1226 in FIG. 12, the metric may be represented as a series of numeric values $x_k$, each numeric value $x_k$ generated by a function $x(t_k)$, where $t_k$ is the time associated with the $k^{th}$ numeric value $x_k$. There are n numeric values in the metric data FIG. 13 illustrates a configuration-management database ("CMDB"). A CMDB is logically organized as a graph in which various components and subsystems of the computer system are represented by object nodes. The object nodes may be associated with metrics and properties and are linked together via relationship nodes. FIG. 13 shows a small portion of the logical organization of a CMDB representing a current state of a computer system. This portion includes three object nodes 1302-1305. Each object node is associated with multiple properties, such as properties 1306 associated with object node 1305, and multiple metrics, such as metrics 1308 associated with object 1305. Properties are essentially attributes and have values. A property value may be expressed as a string, numeric value, and by other types of encodings. Metrics are generally associated with a sequence of data points, each comprising a data value and an associated timestamp, as discussed above with reference to FIG. 12. Pairs of objects are connected through relationships, such as relationship 1310 connecting object 1302 to object 1303. Object 1302 may, for example, represent a data-storage device, object 1303 may represent a data-storage-device controller, and relationship 1310 may represent an "is a component of relationship" between objects 1302 and 1303. In certain CMDB implementations, relationships may express, in addition to one-to-one relationships, one-to-many and many-to-many relationships.

Figure 14A:
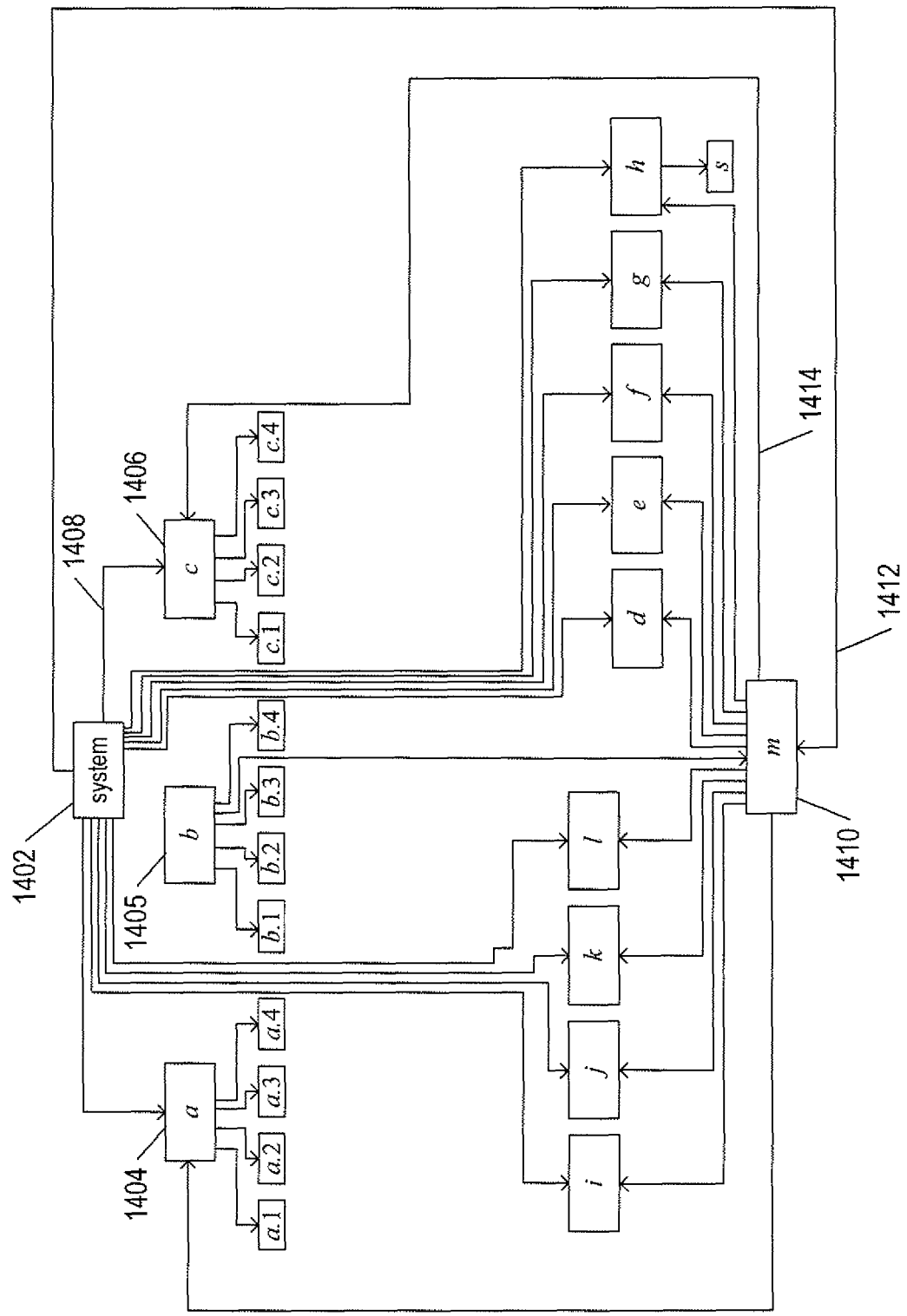
FIGS. 14A-B illustrate a CMBD representation of the hypothetical system 1102 discussed with reference to FIG. 11.
Figure 14B:
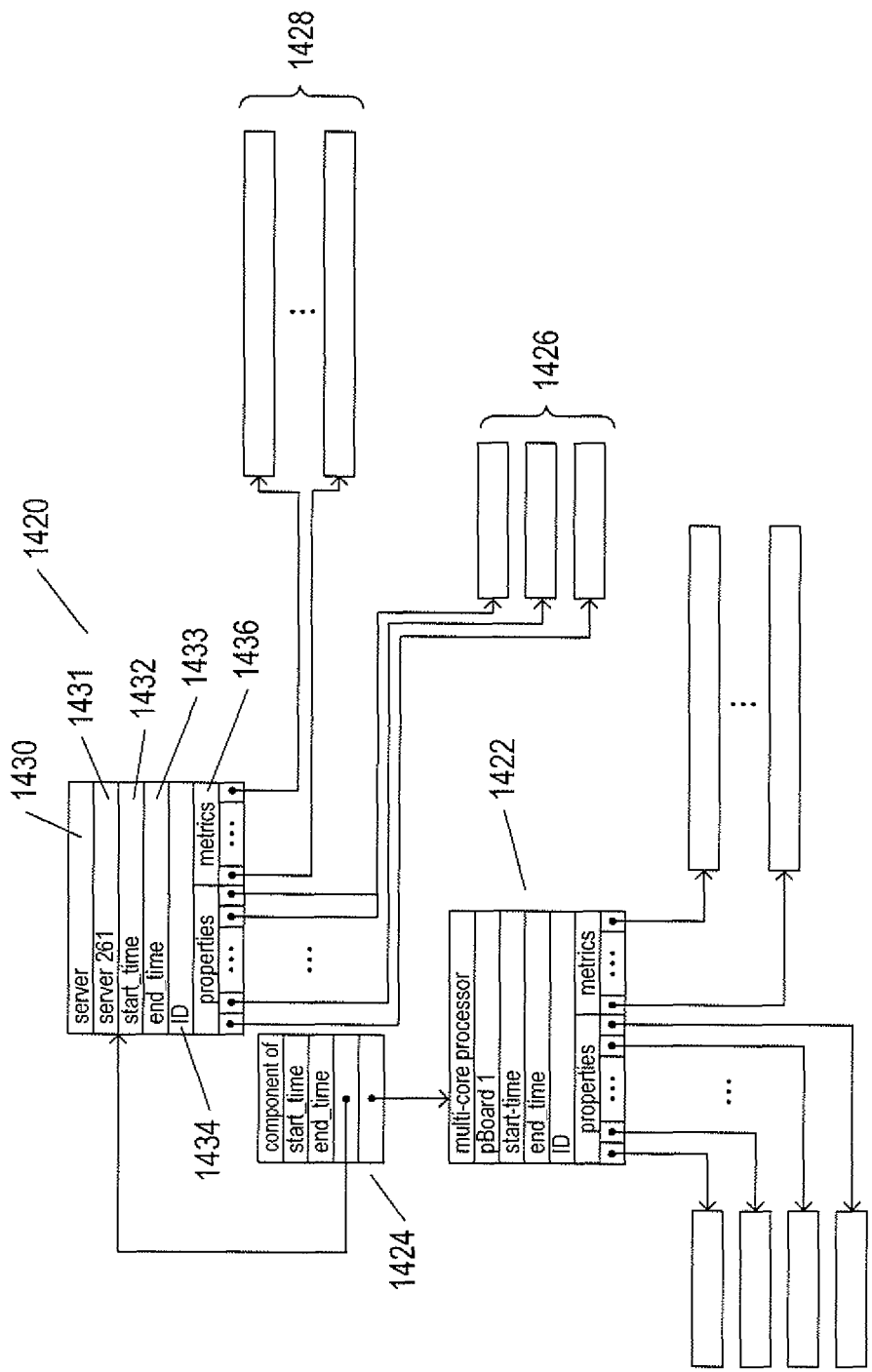

FIGS. 14A-B illustrate a CMBD representation of the hypothetical system 1102 discussed with reference to FIG. 11. In FIG. 14A, the object nodes of a CMDB representation of the hypothetical system are shown with arrows connecting the object nodes, rather than showing the object nodes connected through relationship nodes, the relationship nodes, property nodes, and metric nodes omitted for the sake of clarity. The system as a whole is represented by object node 1402. Subsystems a 1104, b 1105, and c 1106 shown in FIG. 11 are represented by object nodes 1404-1406, respectively. Each arrow connecting object node 1402 and object nodes 1404-1406, such as arrow 1408, represent an "is a component of" relationship. Object node 1410 represents an internal bus in in the hypothetical system 1102. Arrow 412 represents an "is a component of" relationship while the arrows emanating from node 1410 to other object nodes, including arrow 1414, represent an "is connected to" or a "provides communications services to" relationship. Were the relationship nodes, properties, and metrics for the small hypothetical system 1102 discussed above with reference to FIG. 11 included in the graph shown in FIG. 14A, it would be far too complex to illustrate in a single-page diagram. For a large distributed computer system with tens of thousands or more components, a CMDB graph describing the operational state and configuration of the distributed computing system is enormously complex and voluminous.

FIG. 14B shows several example nodes of a CMDB at a greater level of detail than shown in FIGS. 13 and 14A. A first object node 1420 represents a server and a second object node 1422 represents a multi-core processor within the server. Relationship node 1424 represents an "is a component of" relationship between the server 1420 and multi-core processor 1422. Both object nodes 1420 and 1422 are linked to multiple property nodes and metric nodes, including property nodes 1426 and metric nodes 1428 linked to object node 1420. The server node 1420 includes a variety of different fields, including a type field 1430, a name field 1431, a start-time field 1432, an end-time field 1433, and an ID field 1434. In addition, the server node includes references or links 1436 to the various property and metric nodes 1426 and 1428 to which the server node is linked. Similarly, the multi-core-processor node 1422 includes multiple fields. Each node includes a start-time and end-time field that indicates when the node was initially added to the CMDB representation of the system and, in case a node is subsequently deleted, the time of deletion. CMDB nodes may contain many additional fields and information. The details of the property and metric nodes are not shown in FIG. 14B, but each of these also include multiple fields.

Figure 15A:
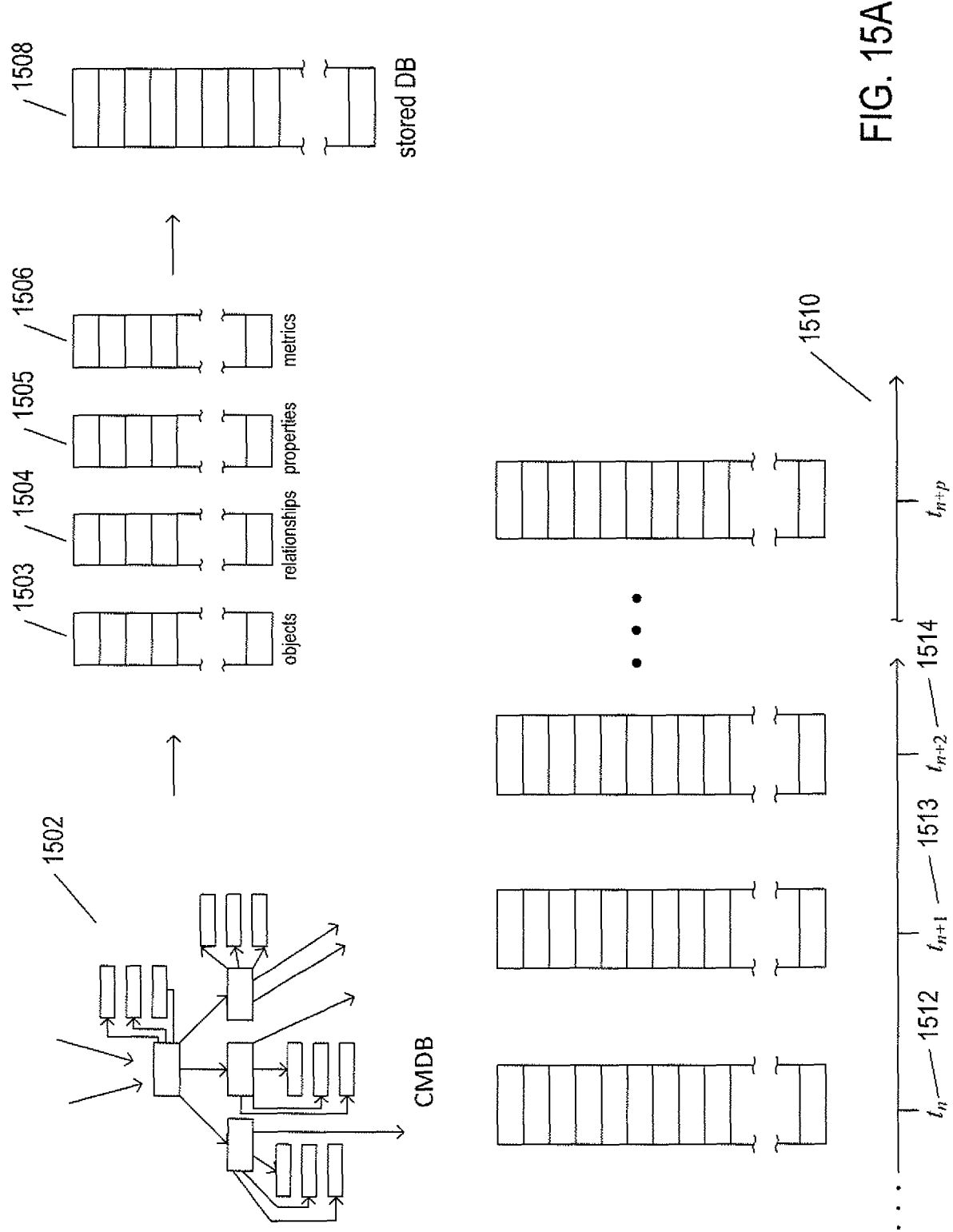
Figure 15B:
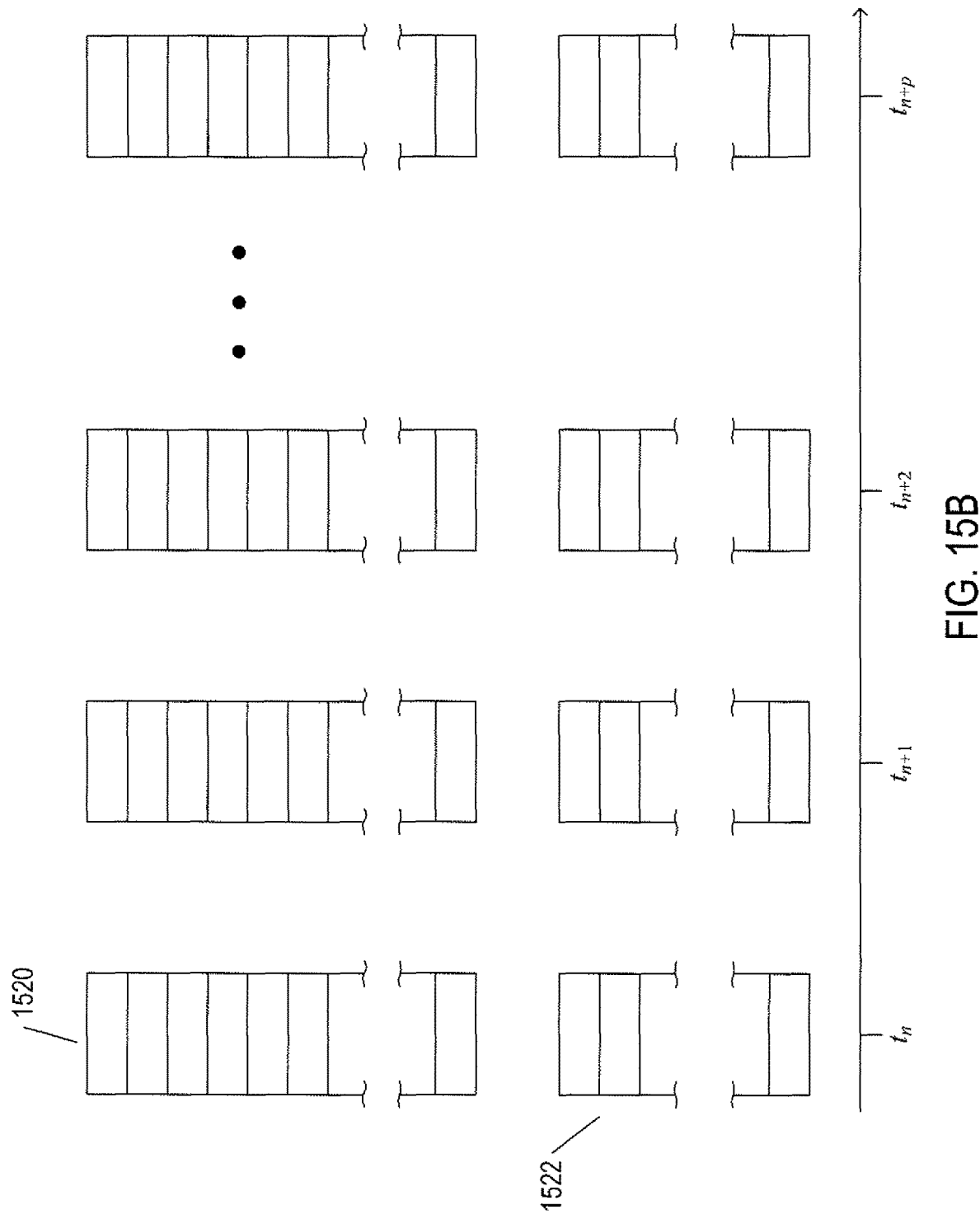

FIGS. 15A-C illustrate currently used techniques for storing the contents of a CMDB within a computer system. As shown in FIG. 15A, the system state and configuration is encoded within the CMBD 1502. The CMDB lives, in part, in memory, and, in part, in one or more physical data-storage devices. The CMDB can be stored in memory as sets of object entities 1503, relationship entities 1504, property entities 1505, and metric entities 1506. In CMDBs that include additional types of nodes, these additional types of nodes would also be stored in a set of entities of that type. References to in-memory nodes in CMDB nodes are converted to indexes into entity sets, in certain implementations. The stored nodes are then generally compressed to generate a representation 1508 of the CMDB that, in turn, represents a state of the system at a particular point in time. As shown in the lower portion of FIG. 15A along a timeline 1510, stored representations of the contents of the CMDB are generally saved at intervals, including the intervals $t_n$ 1512, $t_{n+1}$ 1513, $t_{n+2}$ 1514, and so forth. By storing the contents of the CMDB at points in time, the state of the system is essentially stored as a set of snapshots at points in times, allowing the system state to be later recovered for various reasons, including diagnosis of problems, restoring the system state to a previous state, identifying and analyzing long-term trends in the operational characteristics of a system, and for many other reasons.

As shown in FIG. 15B, the data representations of the system states, such as data representation 1520, are generally compressed to efficiently store the data representation in physical data-storage devices. As shown in FIG. 15B, compression of CMDB-contents 1520 produces a much smaller, compressed version 1522 of the data representation of the current contents of the CMDB. However, traditional compression has numerous drawbacks. One drawback is that recompressing the stored data representations of the contents of the CMDB at regular intervals ends up redundantly storing a great deal of information in the case that many of the object nodes, properties, and other stored information do not rapidly change over time. Another problem is that many compression methods are computationally intensive, as are the methods needed to recover the data from its compressed form. As a result, the recovery of CMDB data from multiple compressed snapshots needed for many types of systems-operations analysis may require large amounts of computational bandwidth and significant temporal latency.

FIG. 15C shows a difference-based method for compressing the data stored at each time interval in order to maintain snapshots of the contents of the CMDB. In this method, an initial full snapshot 1530 is stored in memory 1532. Thereafter, the current state of the system is compared to the previous state of the system in a differencing operation, represented in FIG. 15C by the small circled minus signs 1534-1537, and only the portions of the contents of the CMDB that have changed since the last snapshot, referred to as a "delta difference," are stored. In FIG. 15C, the delta differences 1540-1543 are shown as being stored within the system at time intervals along timeline 1544. In hybrid systems, the delta differences and the initially stored data representation of the contents of the CMDB 1532 may be additionally compressed by any of various compression methods prior to storage.

Figure 16A:
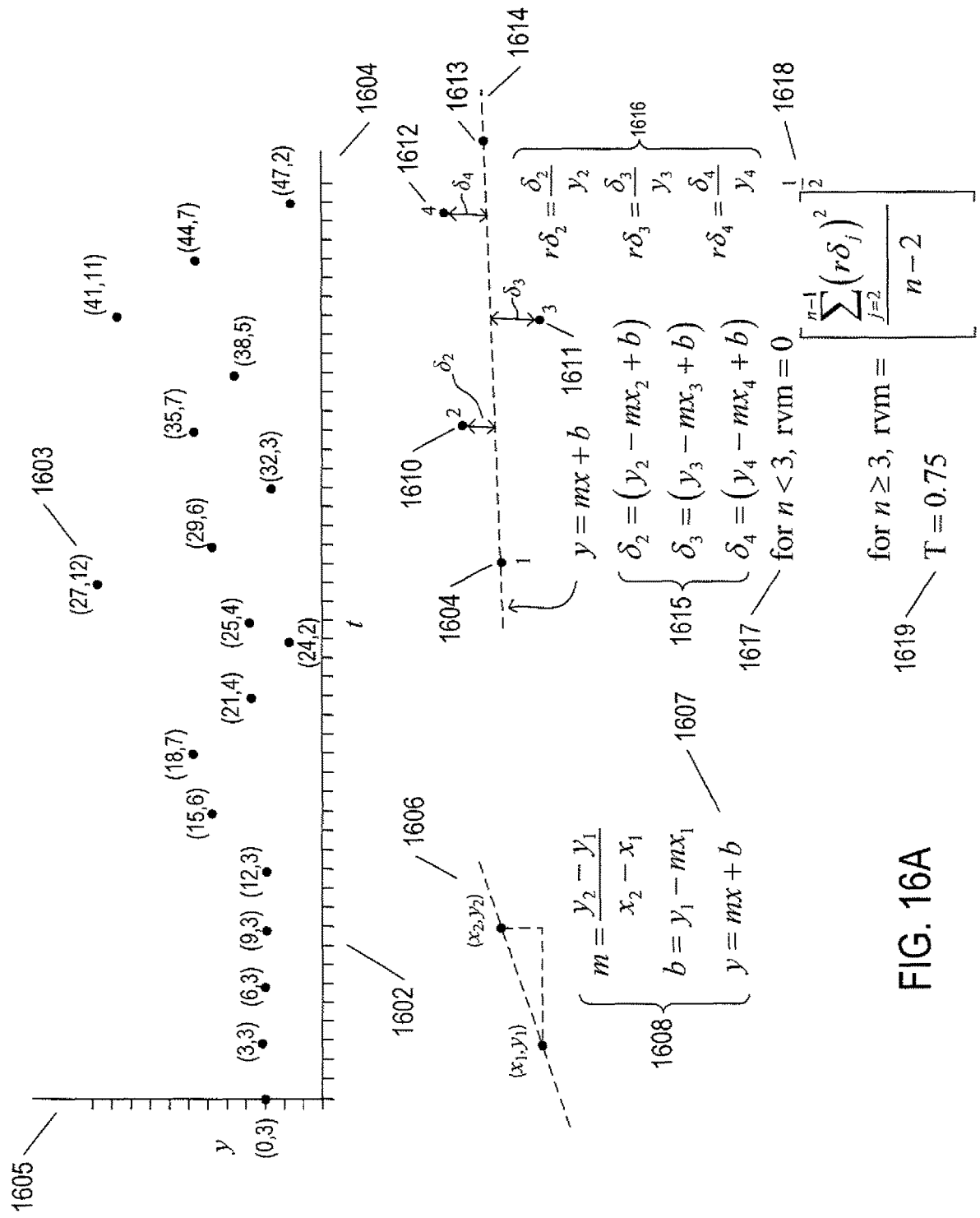

FIGS. 16A-L illustrate a more efficient method for storing metric and property data representations that can be used to significantly decrease the physical-data-storage overheads associated with storing the contents of a CMDB in memory and in physical data-storage devices. In FIG. 16A, a very small sample of the metric data associated with a particular metric is plotted in plot 1602. The metric data is represented as data points, such as data point 1603, plotted with respect to a horizontal time axis 1604 and a vertical data-value axis, also referred to as the y axis, 1605.

As shown in the left-hand, lower portion of FIG. 16A, a line can be constructed through any two data points 1606 and an algebraic equation for the line 1607 is easily obtained via equations 1608. The data points within a time interval can be approximated by a line. As shown in the lower right-hand portion of FIG. 16A, five data points 1609-1613 may be approximated by the line represented by dashed line 1614. This line is drawn through the first 1609 and last 1613 of the data points. The interior data points 1610-1612 do not fall on the line. Two of the data points 1610 and 1612 lie above the line and one of the data points 1611 lies below the line. The vertical distances $\delta_2$-$\delta_4$ 1615 between these data points and the approximating line are easily computed using the equation of the line and the coordinates of the interior data points. Each relative distance $r\delta_2$, $r\delta_3$, and $r\delta_4$ between an interior data point and the line is computed as the distance between a data point and a line divided by the data value represented by the data point 1616.

A running variation metric ("rvm") can be used to determine, as an approximating line is extended over an increasing number of data points, how well the approximating line approximates the data points. For n data points, rvm is equal to 0 when n is less than 3 1617, since, for two data points, both data points fall on an approximating line constructed to coincide with the data points. For n greater than or equal to 3, the rvm is calculated as the square root of the sum of the relative differences between the data points and the approximating line divided by n−2 1618. The rvm illustrated in FIG. 16A is but one example of many different possible running variation metrics. As one example, the sum of the squared relative differences can be used as an alternative rvm, as can the sum of the vertical distances between the data points and line. Finally, for constructing a representation of the data points associated with a data metric as a sequence of linear functions, discussed below with reference to FIGS. 16B-E, a threshold value 1618 is employed. A linear approximation is extended, data-point-by-data-point, until the rvm exceeds the threshold value. The last-added data point is then considered to be the staring point for a next set of data points to be approximated by a next linear function. This process is next discussed with reference to FIGS. 16B-E, which illustrate the process using the example metric data plotted in plot 1602 of FIG. 16A.

Figure 16B:
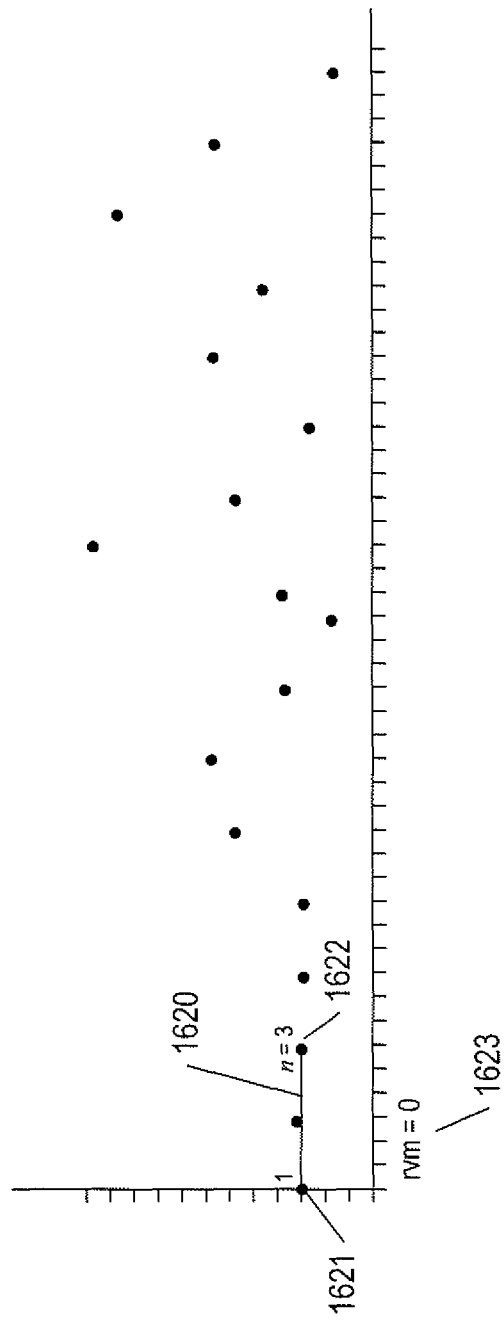
Figure 16C:
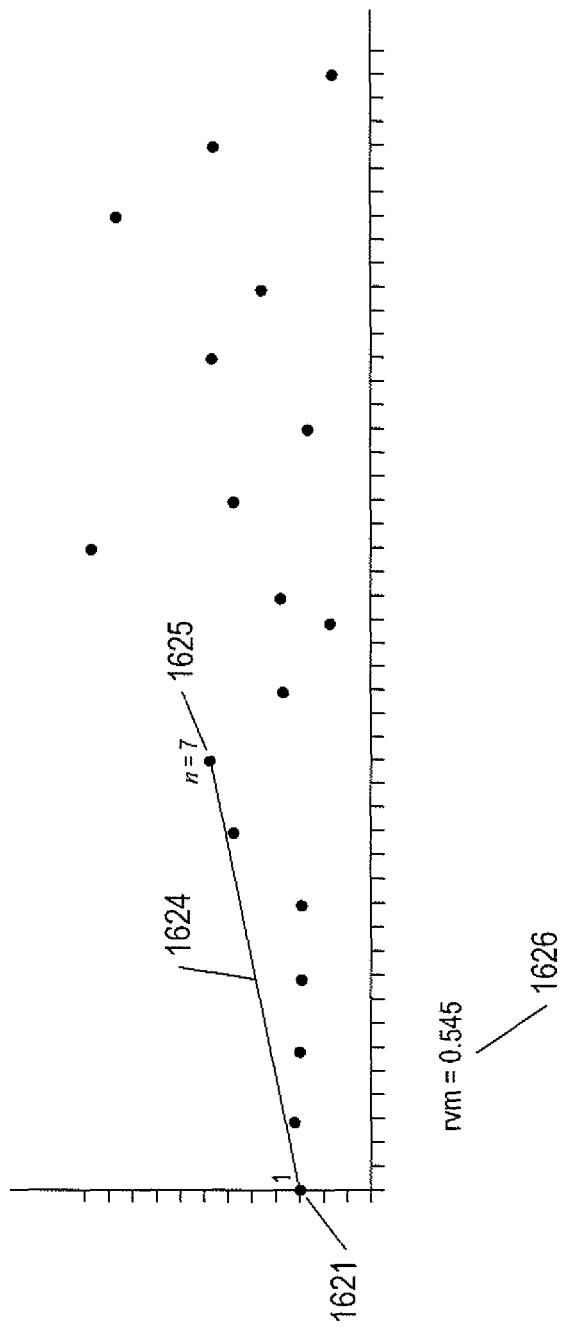
Figure 16D:
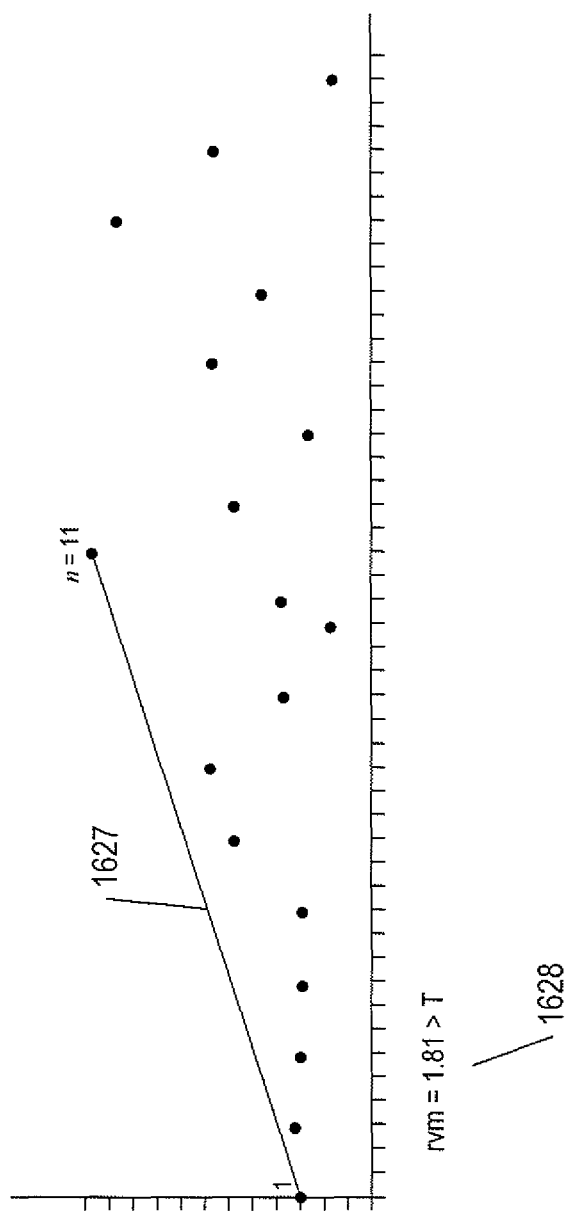

As shown in FIG. 16B, the line 1620 is constructed to coincide with data points 1 (1621) and 3 (1622). Because the first three data points are essentially linear, the computed rvm 1623 is 0. As shown in FIG. 16C, the process continues, data-point-by-data-point, to the approximating line 1624 that is constructed to coincide with data points 1 (1621) and 7 (1625). The computed rvm 1626 is 0.545, still well below the threshold 0.75 (1619 in FIG. 16A). Therefore, the process of approximating data points with a single linear function continues. As shown in FIG. 16D, when the data points n=1-11 are approximated by line 1627, the computed rvm is 1.81 (1628), well above the threshold 0.75. Because the threshold has been exceeded, the first ten data points 1-10 are approximated by a line, since the variation metric for the first 10 data points is below the threshold value 0.75.

Figure 16E:
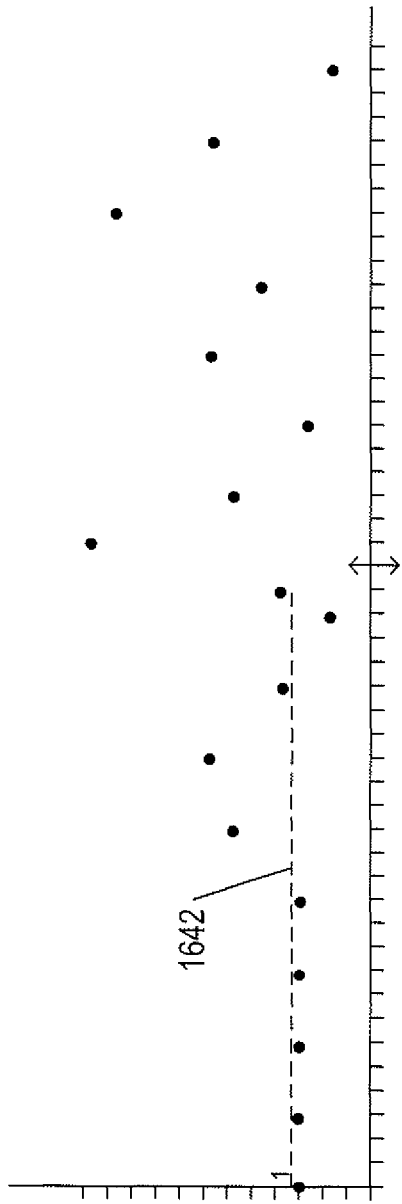

FIG. 16E illustrates construction of an approximating line for the first ten data points. First, ten equations in two variables m and b 1630 are easily obtained from the algebraic slope-and-intercept form for the equation of a line and the coordinates of the first ten data points. Next, an error function 1632, E(m,b), is constructed as the sum of the squared differences in the data values of the data points approximated by the line and the corresponding y values obtained from the equation of the line. In this equation, $y_i$ is the y coordinate for a data point i and $mt_i+b$ is the corresponding y value coincident with the line at the time associated with the data point, $t_i$. For the current example, the error equation can be algebraically constructed to produce equation 1634. The partial derivatives of this equation with respect to m 1636 and b 1638 are then obtained, providing two equations in the two unknowns m and b. Solution of this set of two equations and two unknowns produces values for m and b 1640 for the approximating line 1642 for the first ten data points. This method is readily cast as a simple matrix-inversion problem in linear algebra. The endpoints for an approximating line segment parallel to the computed approximating line can be chosen by various methods. In one method, the end points are chosen to have the same time value as the first and last data points approximated by the line segment.

Figure 16F:
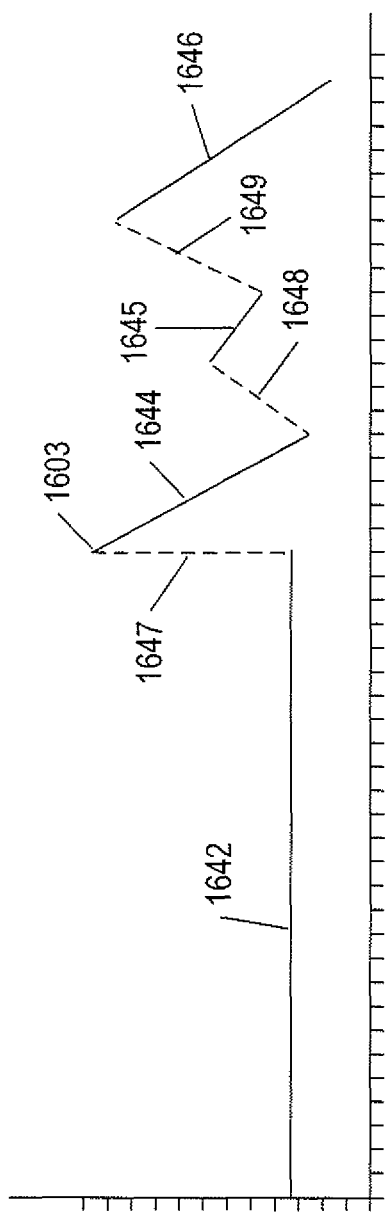
Figure 16H:
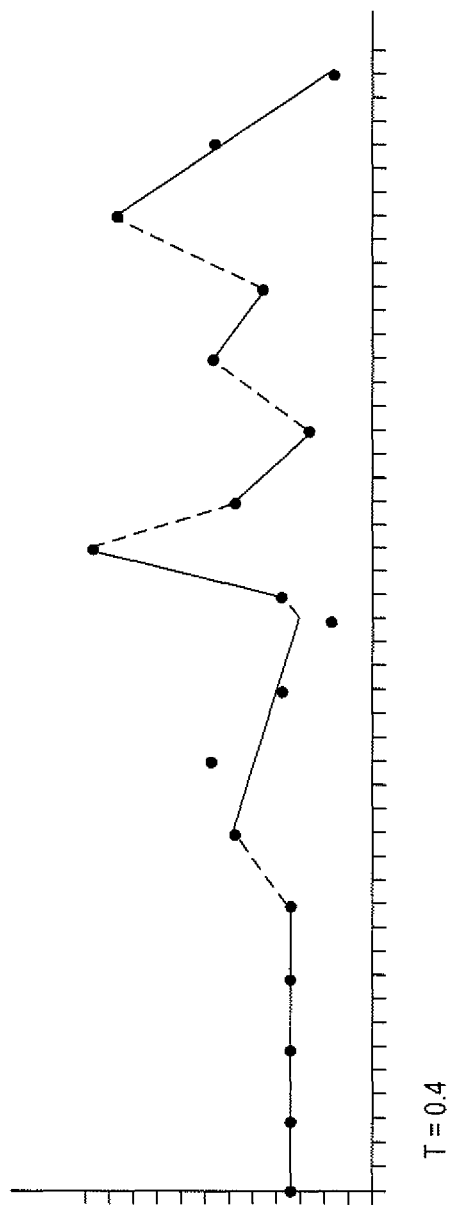
Figure 16I:
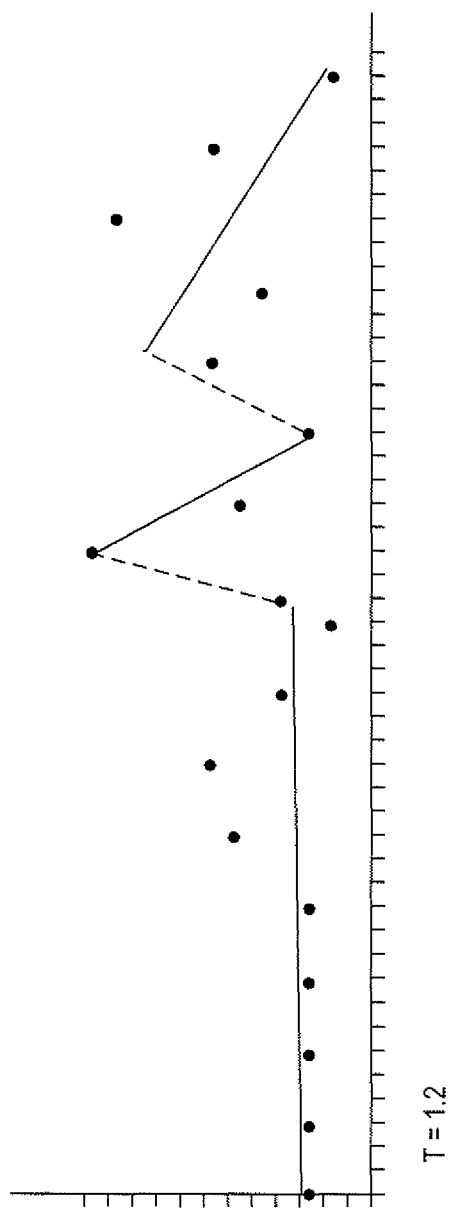
Figure 16K:
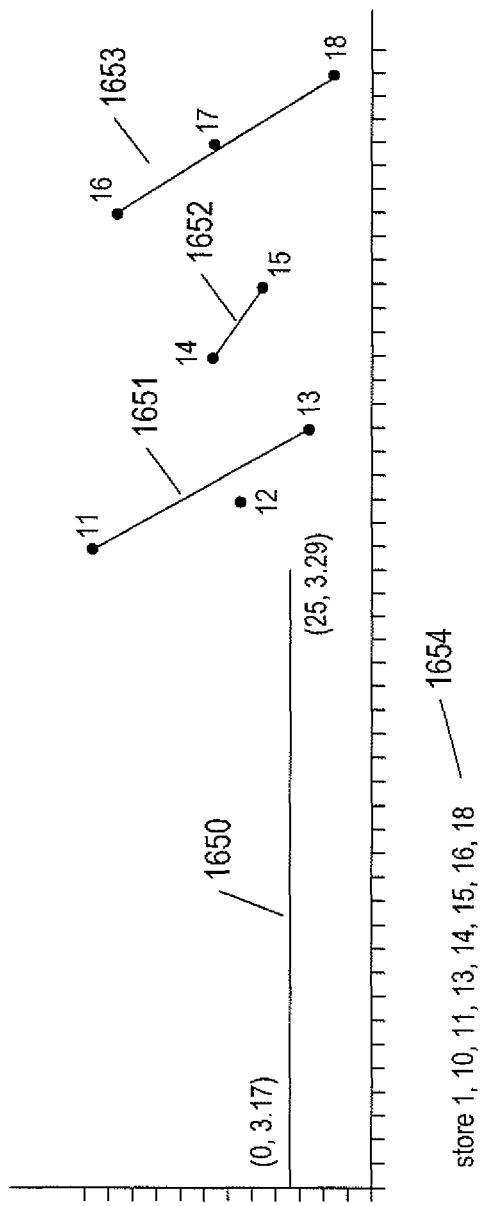

As shown in FIG. 16F, the process resumes with the 11$^{th}$ data point 1603 and results in generation of a second line 1644 that approximates data points 11-13. The process again resumes to create a third line 1645 that approximates data points 14 and 15, after which a final iteration produces a final line 1646 that approximates data points 16-18. The dashed lines 1647-1649 are implied and easily computed to coincide with the point at the end of a previous line and a point at the beginning of the next line. Thus, when the threshold T=0.75 (1619 in FIG. 16A), the 18 data points plotted in plot 1602 in FIG. 16A can be represented by four linear approximations 1642 and 1644-1646. These four line segments can be encoded as eight sets of coordinates for the endpoints of the line segments. The original data points would be encoded by 18 sets of coordinates. Thus, even for this simple example, a relatively favorable compression ratio is obtained. In actual metric data, the compression ratios can be extremely high, since the time-associated values for many metrics and properties may vary slowly with respect to time or vary rapidly, but slightly, over time, or may vary linearly with respect to time, in which case large numbers of data points can be relatively accurately approximated by a single line segment.

The value of the threshold T generally controls how many different line segments are constructed in order to approximate the data. FIGS. 16G-J illustrate the approximating lines obtained by the above-described method when the value of T is 0.2, 0.4, 1.2, and 3.5, respectively. As T increases, the number of approximating lines, or linear functions, decreases. For low values of T, such as the value T=0.2, the results from which are shown in FIG. 16G, only those data points that almost exactly fall on a line are represented by a line, and thus the data metrics are approximated by seven, rather than four line segments when T=0.2. By contrast, for high values of T, such as T=3.5, the results for which are shown in FIG. 16J, a single line segment ends up approximating all of the metric data. Thus, by assigning the rvm threshold on a metric-by-metric basis, the data compression achieved by representing metric data by linear functions can be tailored to approximate particular metrics with particular desired accuracies. Alternatively, groups of metrics may be assigned common values of T, partitioning the metrics into accuracy-of-representation classes. In certain cases, a single rvm threshold may be used.

Figure 16L:
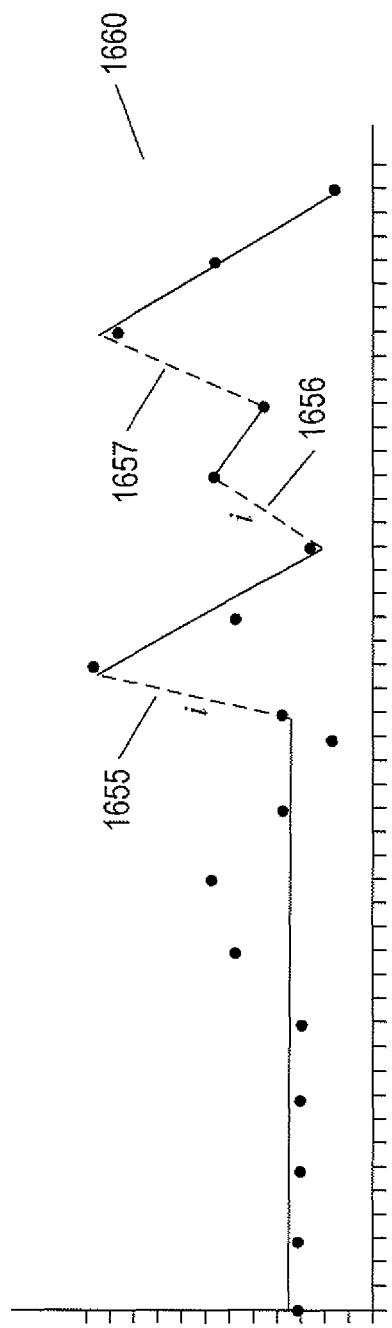

FIG. 16K again illustrates the representation of the metric data plotted in plot 1602 of FIG. 16A by linear functions when the rvm threshold is equal to 0.75. The above-described process generates the four line segments 1650-1653. This representation can be encoded as the coordinates for data points 1, 10, 11, 13, 14, 15, 16, and 18 (1654). As shown in FIG. 16L, when the encoding is used to restore the metric data, the lines connecting these four line segments 1655-1657 can be easily constructed to form a single function consisting of seven line segments 1660 that reasonably accurately represents the original metric data plotted in plot 1602 of FIG. 16A.

Figure 17B:
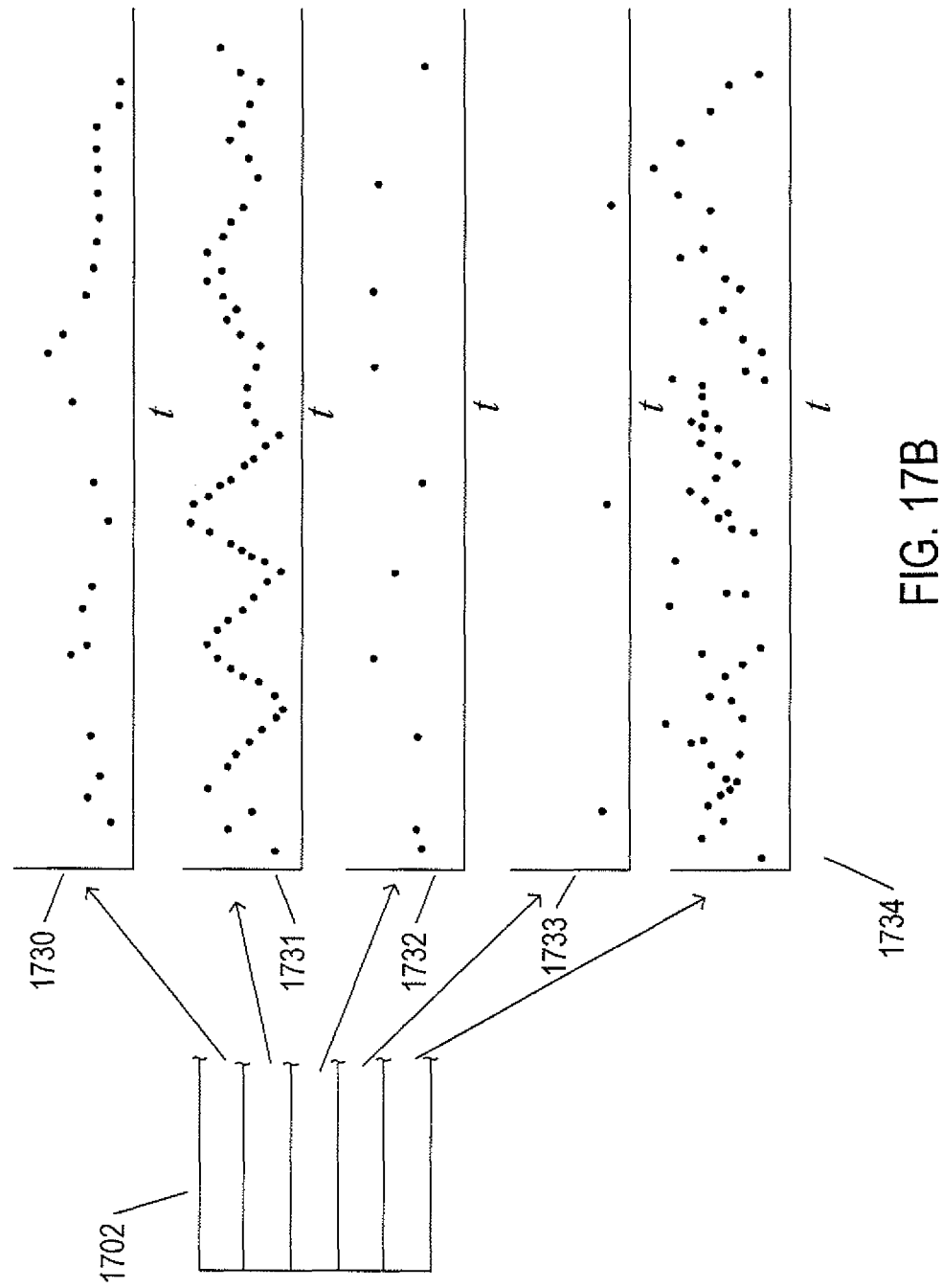
Figure 17C:
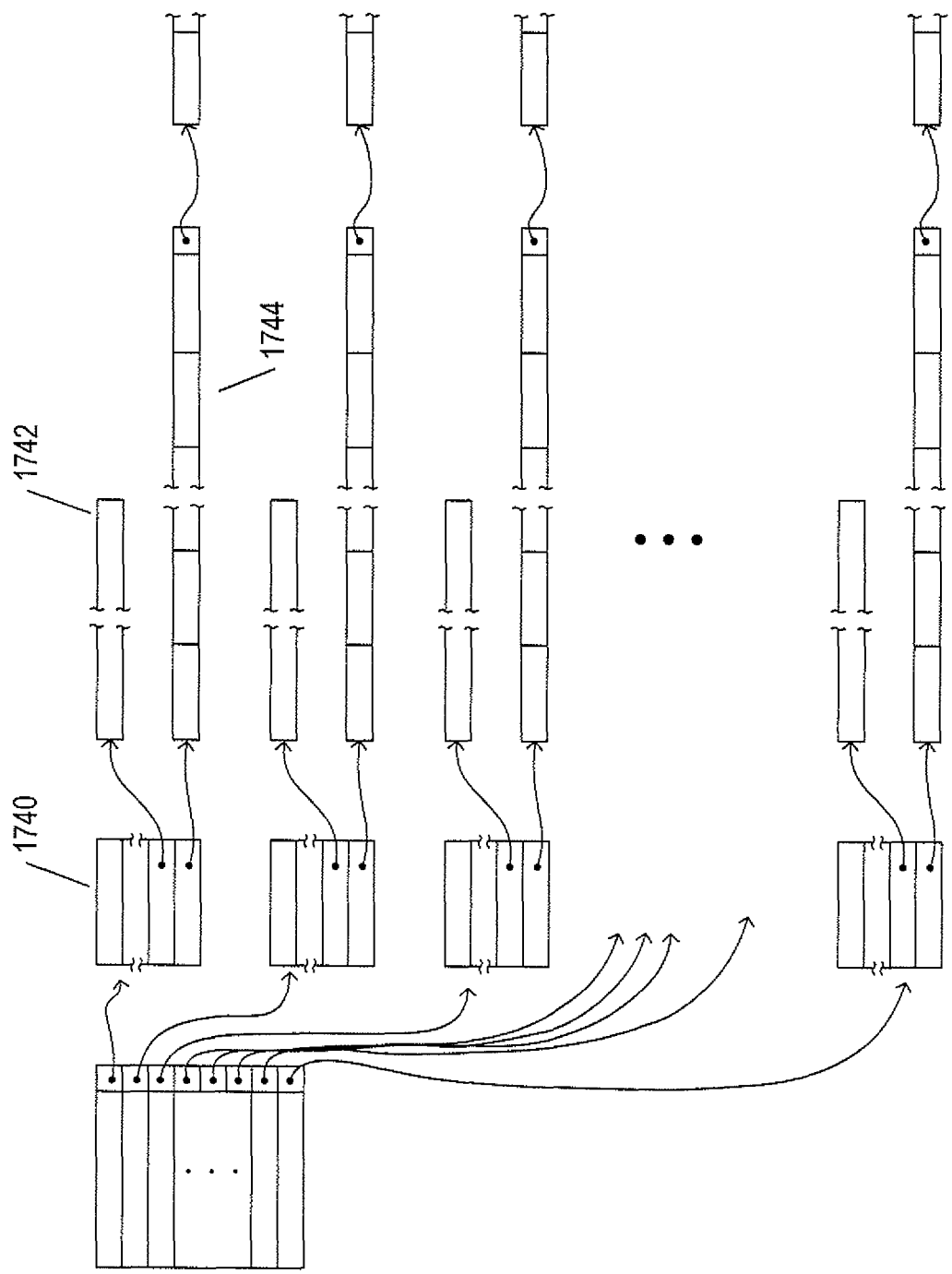

FIGS. 17A-C illustrate the use of ongoing linear approximation of metric data for both properties and metrics associated with CMDB objects in order to compactly store property and metric data within the CMDB. An example node is shown at the top of FIG. 17A, 1702. This node includes five fields 1704-1708. Fields 1705 and 1708 contain integer data, fields 1706 and 1707 contain floating-point data, and field 1704 contains character-string data. As indicated by arrow 1710, the character-string data may be converted to integer data. This process is illustrated in the lower portion of FIG. 17A 1712. A hash-like function 1713 can be applied to the character-string data 1714 to produce a numeric value 1715 that is used as an index into a hash table 1716. The hash table includes a character-string entry 1718 corresponding to a particular index 1718 as well as a reference 1719 to a linked list 1720 of additional character-strings that map to the particular index, referred to as a "collision list." Thus, multiple character strings may correspond to any particular index generated by the hash value. A character string can then be represented by an integer 1722 that includes the index for the character string 1724 generated by the hash function as well as a secondary index 1726 that indicates whether the hash-table entry should be used or whether, instead, one of the entries in the linked list referenced from the hash-table entry should be used. In one scheme, the secondary indices are selected from the sequence of small integers 0, 1, . . . , 256, with the value "0" indicating that the hash-table entry should be used and the values 1, 2, . . . , 256 indicating that a position within the linked list of the character string corresponding to the numeric value of the secondary index should be used.

Thus, all the property and metric data referenced from an object node of a CMDB representation of the state of a computer system can be represented as sequences of numeric values. For convenience, integer vales can also be represented as floating-point values, so that all of the property and metric data can be represented as a sequence of time-associated floating-point values. As shown in FIG. 17B, the time-varying values of the fields of the node 1702 can be visualized as data-value versus time plots 1730-1734. As shown in FIG. 17C, property and metric data can be uniformly represented by nodes, such as node 1740, that contain fields describing the type of data represented, the name for the property or metric, and other such data as well as a reference to a temporary raw-data bin 1742 and a reference to sets of data points, stored in linked lists of allocated objects 1744, that represent the line segments of a linear-function representation of the time-associated data values for the property or metric. Thus, metric and property data can be initially stored in raw form and periodically converted to linear-function approximations. This results in storage of far less data and therefore facilitates efficient storage of the current state of a computer systems as well as storage of compressed snapshots, since compression of smaller amounts of data results in smaller compressed delta differences.

Figure 18A:
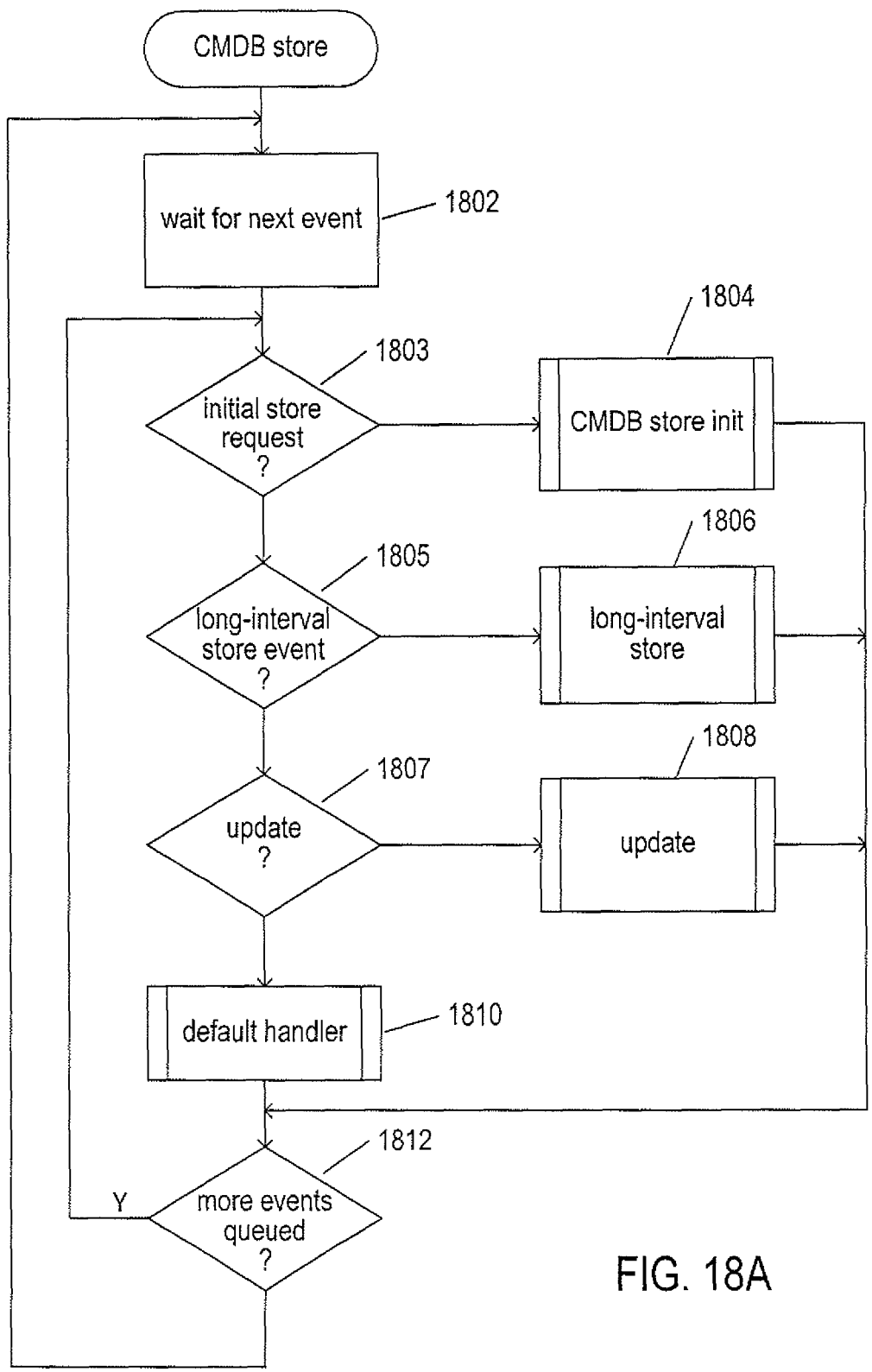
FIGS. 18A-D illustrate, using control-flow diagrams, a CMDB-store subsystem within a computer system that periodically stores data-representation snapshots of the contents of a CMDB that represents the current state of the computer system.

FIGS. 18A-D illustrate, using control-flow diagrams, a CMDB-store subsystem within a computer system that periodically stores data-representation snapshots of the contents of a CMDB that represents the current state of the computer system. The CMDB-store subsystem is logically represented as an event loop, as shown in FIG. 18A. The subsystem waits for a next event to occur, in step 1802, and then handles the event. When the next-occurring event is an initial CMBD store request, as determined in step 1803, the routine "CMDB store init" is called in step 1804. When the next-occurring event is a long-interval store event, as determined in step 1805, the routine "long-interval store" is called in step 1806. When the next event is an update event, as determined in step 1807, the routine "update" is called in step 1808. A default handler handles all other events in step 1810. When there are more events queued to handle, as determined in step 1812, control returns to step 1803. Otherwise, control returns to step 1802, where the CMDB-store subsystem waits for another event to occur.

Figure 18B:
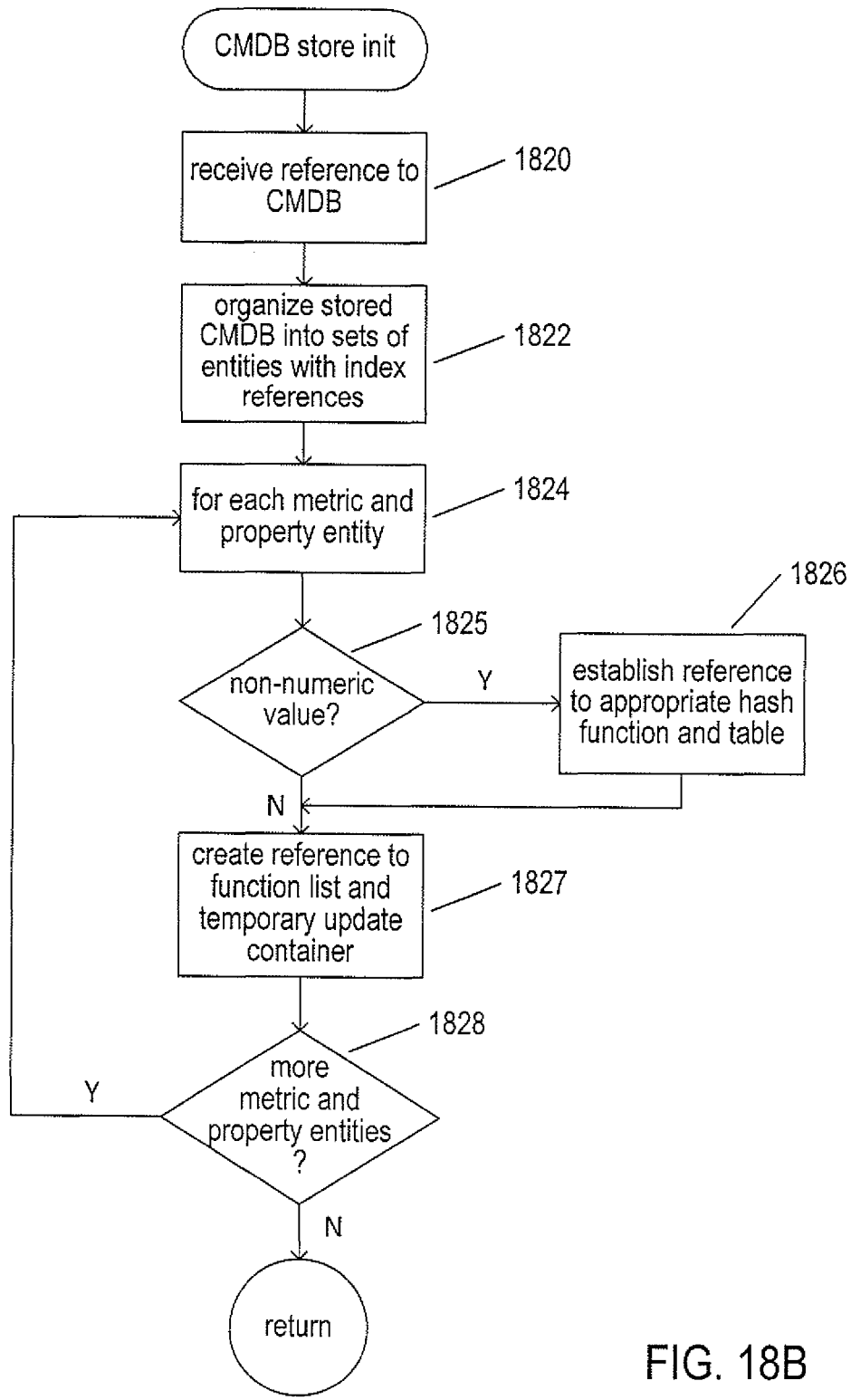

FIG. 18B provides a control-flow diagram for the handler "CMDB store init" called in step 1804 of FIG. 18A. In step 1820, the handler receives a reference to a CMDB. In step 1822, the handler organizes the contents of the CMDB into sets of entities, as shown at the top of FIG. 15A. In the for-loop of steps 1824-1828, the handler considers each metric and property entity within the CMDB. Non-numeric fields in the metric or property entity are prepared for conversion to floating-point values by establishing a reference to an appropriate hash function and table, in step 1826. A reference to a linear-function list and temporary update container, or raw-data bin, is established in step 1827 for each property and metric entity. Thus, the representation discussed above with reference to FIG. 17C is established for all of the property and metric entities associated with object nodes of the CMDB as well as for any representations of the CMDB stored in physical data-storage devices.

Figure 18C:
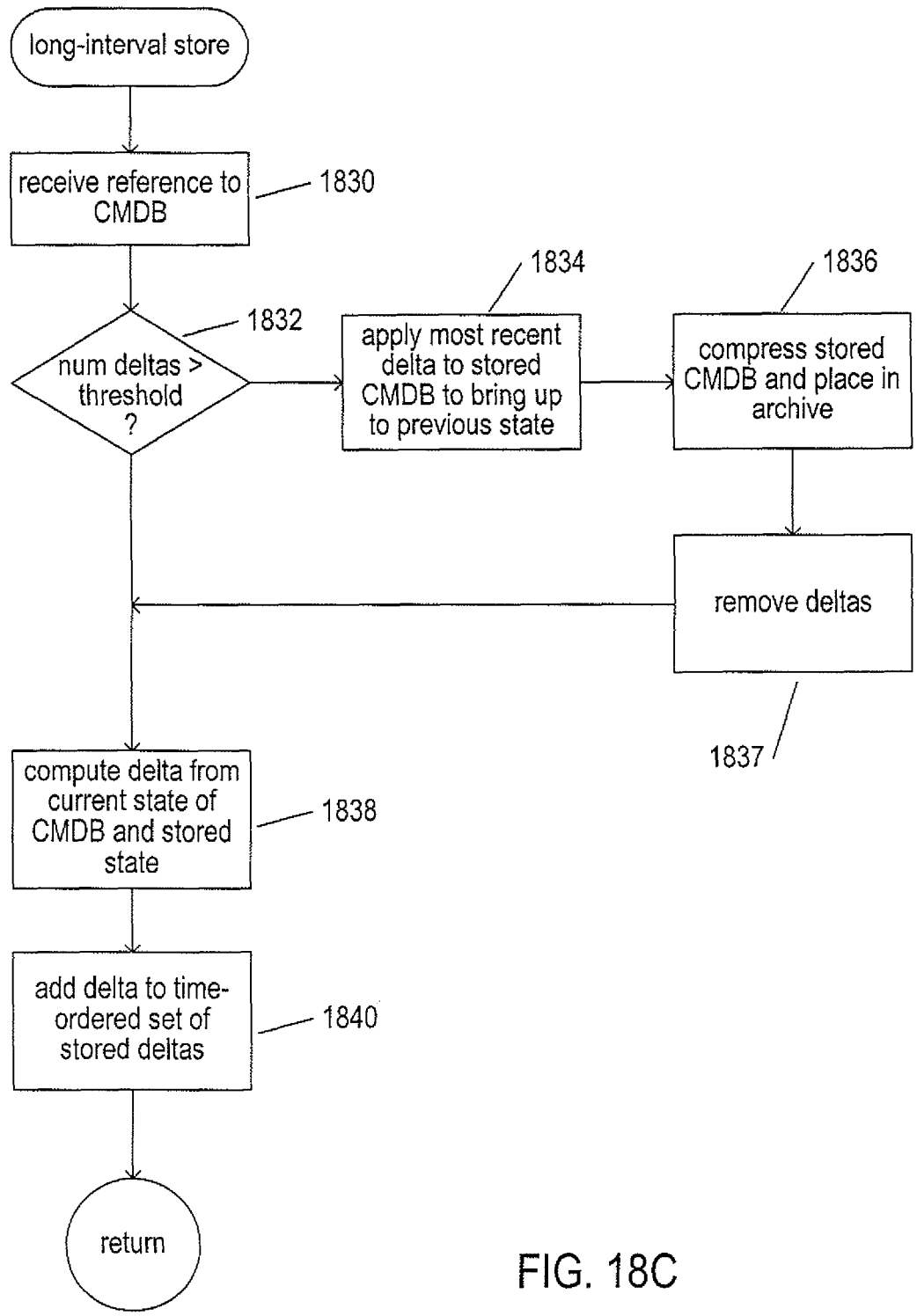

FIG. 18C provides a control-flow diagram for the long-interval-store handler called in step 1806 of FIG. 18A. In step 1830, the handler receives a reference to a CMDB. When the number of delta differences already stored for the CMDB is greater than a threshold value, as determined in step 1832, the most recent delta difference is applied to a stored representation of the contents of the CMDB to bring the stored representation up to a state, in step 1834, reflective of the state of the computer system at the time of the previous long-interval time point and a copy of stored CMDB data is compressed and placed in an archive, in step 1836. The delta differences are then removed in step 1837. A delta difference for the current state of the CMD with respect to the previous, stored state is computed in step 1838 and added to the time ordered set of delta differences for the CMDB in step 1840.

Figure 18D:
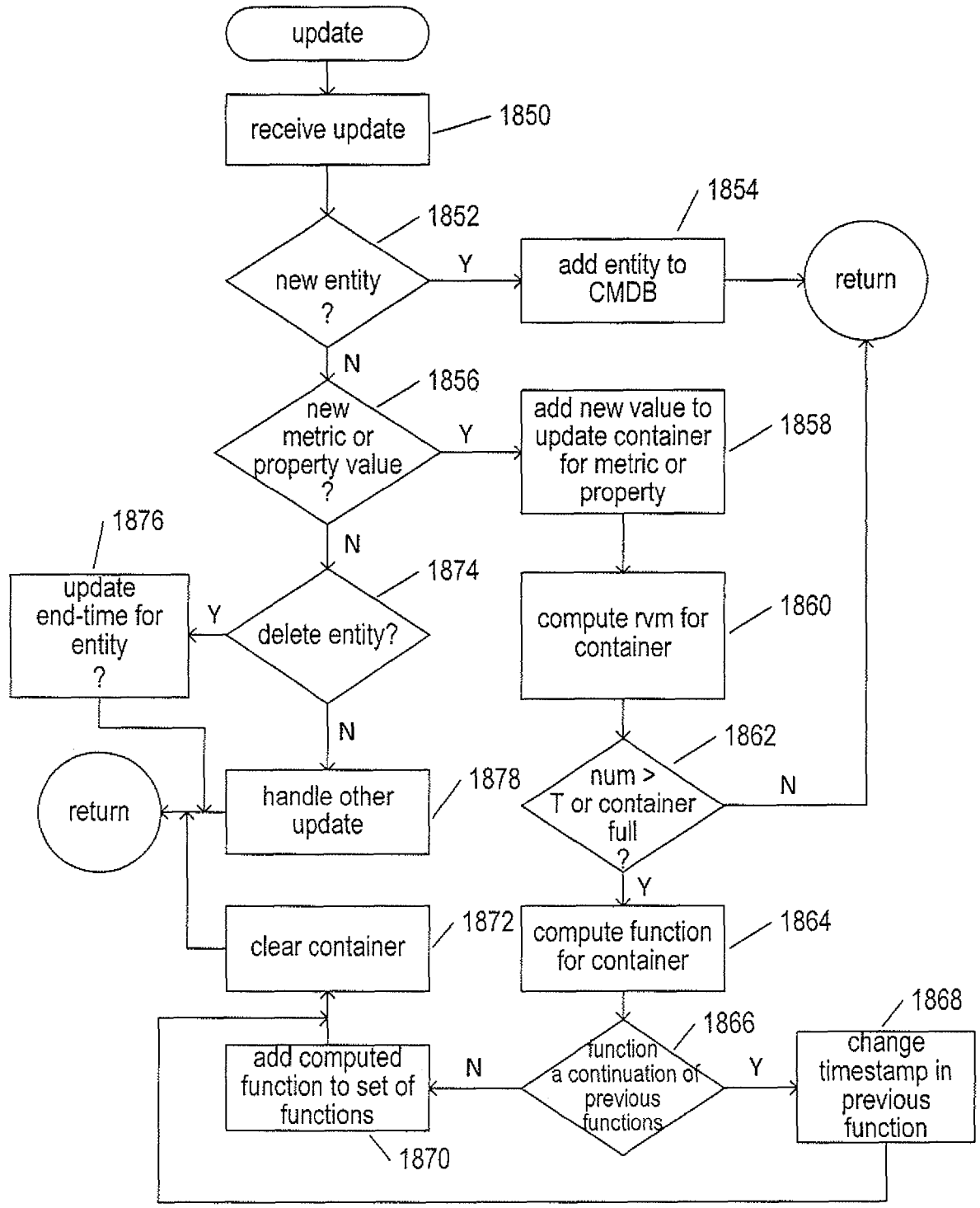

FIG. 18D provides a control-flow diagram for the update handler called in step 1808 of FIG. 18A. In step 1850, a next update to the CMDB is received. When the next update represents the addition of a new entity to the CMDB, as determined in step 1852, the entity is added to the CMDB in step 1854. Otherwise, when the update represents the addition of a new metric value or property value to the CMDB, as determined in step 1856, the new value is added to the container for updates, in step 1858, for the metric or property. In step 1860, the current rvm for the container is computed. When the computed rvm is greater than the threshold value, or when the container is full, as determined in step 1862, a next linear function is computed for the data points stored in the container, in step 1864. When this next function is a continuation of the previous linear function, as determined in step 1866, the timestamp in the previous function is changed, in step 1868, to add the new function. Otherwise, a new computed function is added to the set of functions for the metric or property in step 1870. In step 1872, the container is cleared. When the update is an entity-delete updated, as determined in step 1874, then the end-time field for the entity is updated, in step 1876. All other updates are handled in step 1878.

Although the present invention has been described in terms of particular embodiments, it is not intended that the invention be limited to these embodiments. Modifications within the spirit of the invention will be apparent to those skilled in the art. For example, any of many different design and implementation parameters, including hardware, operating-system, and virtualization platforms, programming languages, data structures, control structures, modular organization, and other such design and implementation parameters may be varied to produce alternative implementations. Representation of time-series metric and property data by linear functions may be used within a CMDB, within stored data representations of CMDBs, and both. Linear-function representations of time-series metric and property data can be encoded in a variety of different ways and formats and can be generated by various alternative methods in addition to the implemented method discussed above.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A state-information-storage subsystem within a computer system that includes one or more processors, one or more memories, and one or more data-storage devices, the state-information-storage subsystem comprising:
   current state information, including object entities associated with properties and metrics, that is maintained within a combination of one or more memories and one or more data-storage devices;
   state-information snapshots, stored in one or more physical data-storage devices, that encode the state information for the computer system at various previous times in compressed form, including compressed encodings of sequences of data points, each associated with a property or metric, as a set of one or more linear functions; and
   a state-information-storage subsystem control component that maintains the current state information, generates linear-function approximations of data-point sequences, generates state-information snapshots, and stores the state-information snapshots in the one or more physical data-storage devices.

2. The state-information-storage subsystem of claim 1 wherein each metric and property are associated with a sequence data points, each data point comprising a time-associated numeric data value.

3. The state-infoiination-storage subsystem of claim 2 wherein one or more property metric entities are initially associated with one or more data points having a non-numeric time-associated data value; and wherein the state-information-storage subsystem converts the non-numeric data values of the data points to numeric values.

4. The state-information-storage subsystem of claim 3 wherein the state-information-storage subsystem converts the non-numeric data values of the data points to numeric values by:

for each entity initially associated with one or more data points having non-numeric data values,
associating a hash function and a hash table with the entity;
for each data point containing a non-numeric data value,
applying the hash function to the non-numeric data value to generate a hash-table index,
identifying a hash-table entry indexed by the generated index;
when the non-numeric data value is not already stored in the hash-table entry or a collision list associated with the hash-table entry,
storing the non-numeric data value in the hash-table entry or a collision list associated with the hash-table entry;
generating a numeric value from the generated hash-table index and from a numeric representation of a location of the non-numeric data value within the hash-table entry or collision list, and
replacing the non-numeric data value in the data point with the generated numeric value.

5. The state-information-storage subsystem of claim 2 wherein the state-information-storage subsystem control component generates a set of linear-function approximations of a data-point sequence by:

considering the data-point sequence as a time-ordered set of remaining data points;
creating an empty set of linear-function approximations;
while the time-ordered set of remaining data points is not empty,
when the time-ordered set of remaining data points contains a single data point, adding the single data point as the final entry in the set of linear-function approximations;
when the time-ordered set of remaining data points contains two data points,
approximating the remaining data points with a line segment with endpoints corresponding to the two remaining data points, and
adding a representation of the line segment as the final entry in the set of linear-function approximations; and
when the data-point sequence contains more than two data points,
generating a next line-segment approximation for at least the next two of the remaining data points,
adding a representation of the next line-segment approximation to the set of linear-function approximations, and
removing the data points approximated by the next approximation from the time-ordered set of remaining data points.

6. The state-information-storage subsystem of claim 5 wherein generating a next line-segment approximation for at least the next two of the remaining data points further comprises:

constructing, as a current line segment, a line segment with a first endpoint corresponding to the first remaining data point and a second endpoint corresponding to the third remaining data point to approximate the first three remaining data points;
while a variation computed for the data points approximated by the current line segment is less than a threshold variation and there is a next data point in the time-ordered set of remaining data points,
extending the current line segment so that the second endpoint of the current line segment coincides with the next data point.

7. The state-information-storage subsystem of claim 6 wherein intermediate data points are data points approximated by the current line segment but not coincident with the endpoints of the current line segment;

wherein a relative difference is the difference between the data value of a data point and the intersection of a vertical line coincident with the data point and the current line segment;

wherein the variation computed for the data points approximated by the current line segment is computed as the square root of the sum of the relative differences of the data values of the intermediate data points divided by the number of intermediate data points.

8. The state-information-storage subsystem of claim 6 wherein adding a representation of the next line-segment approximation to the set of linear-function approximations further comprises:

generating an equation of a second line that minimizes the distances between the data values of the data points approximated by the current line segment and the second line; and
adding a representation of the second line to the set of linear-function approximations.

9. The state-information-storage subsystem of claim 1 wherein the state-information snapshots are each associated with a timestamp; and wherein the state-information-storage subsystem maintains stored state information for a time at which a most recent snapshot was generated; and wherein the state-information-storage subsystem generates a next snapshot by computing and storing the differences between the current state information and the stored state information for the time at which the most recent snapshot was generated.

* * * * *